United States Patent
Nagai et al.

(10) Patent No.: US 8,570,702 B2
(45) Date of Patent: Oct. 29, 2013

(54) STATIC ELIMINATING SHEET, STATIC ELIMINATING SYSTEM FOR SHEETS, AND SIMULTANEOUS DESIGN MOLDING METHOD, PRINTING METHOD, AND DEPOSITION METHOD USING STATIC ELIMINATING SHEET

(75) Inventors: Hiroyuki Nagai, Kyoto (JP); Masaki Kashiwagi, Kyoto (JP); Shigeru Hinoshita, Kyoto (JP); Masato Oonishi, Kyoto (JP); Kazuo Arai, Kyoto (JP); Takeshi Sanada, Kyoto (JP); Akihiro Maeda, Kyoto (JP); Hiromitsu Muko, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 13/056,011

(22) PCT Filed: Jul. 30, 2009

(86) PCT No.: PCT/JP2009/063568
§ 371 (c)(1),
(2), (4) Date: Jan. 26, 2011

(87) PCT Pub. No.: WO2010/013775
PCT Pub. Date: Feb. 4, 2010

(65) Prior Publication Data
US 2011/0164341 A1    Jul. 7, 2011

(30) Foreign Application Priority Data
Jul. 31, 2008 (JP) .................................. 2008-198055

(51) Int. Cl.
*H05F 3/02* (2006.01)

(52) U.S. Cl.
USPC .......................................... 361/214; 361/212

(58) Field of Classification Search
USPC ....................................... 430/62; 361/212, 214
See application file for complete search history.

(56) References Cited

U.S. PATENT DOCUMENTS

| 5,405,681 A | * | 4/1995 | Nakayama et al. ........... 428/215 |
| 6,119,597 A | * | 9/2000 | DeMoore et al. ............. 101/483 |
| 6,310,133 B1 | | 10/2001 | Katashima et al. |

(Continued)

FOREIGN PATENT DOCUMENTS

| CN | 2488253 | 4/2002 |
| CN | 1768017 | 5/2006 |

(Continued)

OTHER PUBLICATIONS

European Search Report issued Sep. 8, 2011 in European Patent Application No. 09803017.4, which is a foreign counterpart of the present application.

(Continued)

*Primary Examiner* — Adi Amrany
(74) *Attorney, Agent, or Firm* — Wenderoth, Lind & Ponack, L.L.P.

(57) ABSTRACT

There are provided a substrate sheet, a plurality of design portions arranged independently from each other along a longitudinal direction of the substrate sheet and each including at least a conductive material portion, and a band-shaped static eliminating band portion extending continuously along the longitudinal direction of the substrate sheet and electrically connecting the conductive material portions in the plurality of design portions to each other.

9 Claims, 28 Drawing Sheets

(56) References Cited

U.S. PATENT DOCUMENTS

| | | | |
|---|---|---|---|
| 6,491,379 B1 * | 12/2002 | Kawaguchi et al. | 347/55 |
| 6,641,860 B1 * | 11/2003 | Kaiserman et al. | 427/96.2 |
| 7,087,351 B2 * | 8/2006 | Aylward et al. | 430/20 |
| 7,153,620 B2 * | 12/2006 | Aylward et al. | 430/62 |

FOREIGN PATENT DOCUMENTS

| | | |
|---|---|---|
| CN | 2900603 | 5/2007 |
| EP | 0 554 546 | 8/1993 |
| EP | 0 574 583 | 12/1993 |
| JP | 55-169449 | 12/1980 |
| JP | 3-184894 | 8/1991 |
| JP | 8-90999 | 4/1996 |
| JP | 2003-63156 | 3/2003 |
| WO | 2006/092644 | 9/2006 |

OTHER PUBLICATIONS

International Search Report issued Sep. 29, 2009 in International (PCT) Application No. PCT/JP2009/063568.

Notification of Transmittal of Translation of the International Preliminary Report on Patentability issued Mar. 17, 2011 in International (PCT) Application No. PCT/JP2009/063568.

* cited by examiner

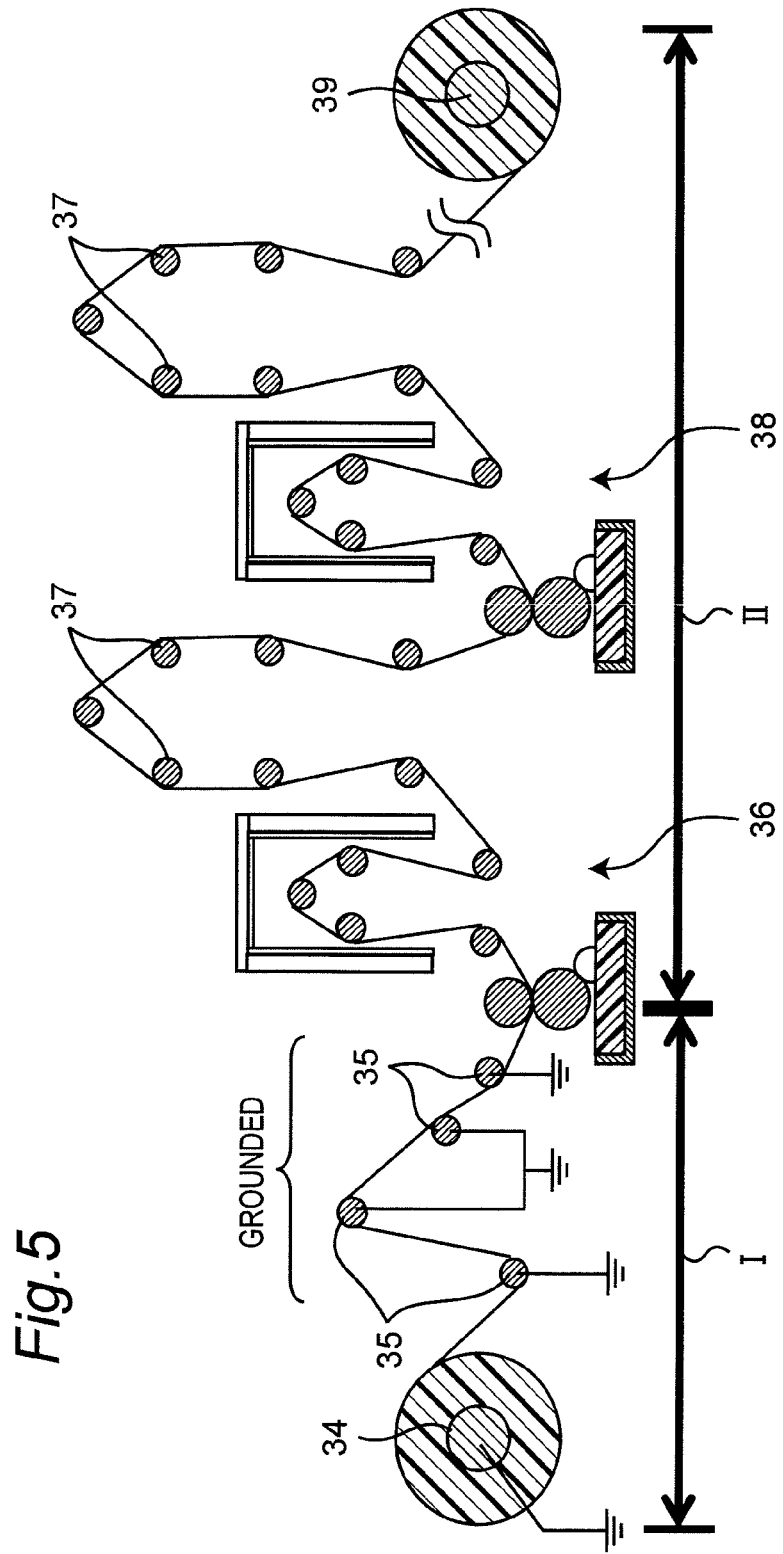

Fig. 8

| | WIDTH OF STATIC ELIMINATION PORTION | AMOUNT OF ELECTRIFICATION IMMEDIATELY AFTER PRINTING | AMOUNT OF ELECTRIFICATION AT WINDING-OFF PORTION | AMOUNT OF ELECTRIFICATION AT TAKE-UP PORTION |
|---|---|---|---|---|
| NORMAL DESIGN | WITHOUT STATIC ELIMINATION PORTION | 14.7 | 3.5 | 8.0 |
| STATIC ELIMINATING DESIGN | 5 mm WIDTH | 3.3 | 0 | 0 |
| | 10 mm WIDTH | 1.5 | 0 | 0 |
| | 15 mm WIDTH | 0.7 | 0 | 0 |

* UNIT OF AMOUNT OF ELECTRIFICATION IS ALL "kV"

STATIC ELIMINATING SHEET, STATIC ELIMINATING SYSTEM FOR SHEETS, AND SIMULTANEOUS DESIGN MOLDING METHOD, PRINTING METHOD, AND DEPOSITION METHOD USING STATIC ELIMINATING SHEET

TECHNICAL FIELD

The present invention relates to a sheet in which a plurality of design portions each including a conductive material portion is provided on a substrate sheet (for example, a transfer sheet or a sheet for forming a transfer sheet), or a static eliminating sheet obtained by providing a sheet in which a plurality of design portions is provided on a substrate sheet (for example, a sheet for forming a transfer sheet) with a static eliminating function, a static eliminating system for sheets, as well as a simultaneous design molding method, a printing method, and a deposition method using the static eliminating sheet.

BACKGROUND ART

Conventionally, a sheet in which a plurality of design portions each including a conductive material portion is provided on a substrate sheet (for example, a transfer sheet or a sheet for forming a transfer sheet) (for example, Patent Document 1) has been used to further form a printed portion by carrying out a printing method, thereby forming a transfer sheet, or the sheet has been used as a transfer sheet to manufacture a simultaneous design molded article by carrying out a simultaneous design molding method. Furthermore, a sheet in which a plurality of design portions is provided on a substrate sheet (for example, a sheet for forming a transfer sheet) has been used to further form a metal deposition portion in a metal deposition step, thereby forming a transfer sheet.

In such cases, in spite of a static eliminating facility provided and grounded in each of the metal deposition apparatus, the printing apparatus, and the molding apparatus, defects have been caused, or the transfer sheets or molded articles have been destroyed by static electrical sparks in large-area deposition portions or conductive ink portions (for example, portions with the area per 1 m of film being 500 cm² or more) and deposition portions isolated in insulating substrate sheets (island-shaped portions arranged to be isolated). Thus, some sort of countermeasure has been demanded.

PRIOR ART DOCUMENT

Patent Document

Patent Document 1: Utility Model Unexamined Publication No. 55-169449

SUMMARY OF INVENTION

Issue to be Resolved by Invention

Thus, first of all, as shown in FIGS. 9A and 9B and FIG. 10, in a deposition step in which a nonconductive metal (for example, tin) is used to form metal deposition portions 103 isolated from each other in the shape of an island on a substrate sheet 102 for a deposition sheet 101A by metal deposition, when the metal deposition portions 103 formed on a design portion 103D on the substrate sheet 102 are brought into contact with a grounded metallic guiding roller 132 while passing through the guiding roller 132 after the formation of the metal deposition portions, electric charges 170 are generated due to friction between the metal deposition portions 103 and the guiding roller 132 and accumulated in the metal deposition portions 103, as shown in FIG. 11. Then, if the electric charges 170 accumulated in the metal deposition portions 103 exceed a certain amount of electric charges, immediately before the metal deposition portion 103 passes through the guiding roller 132, the accumulated electric charges 170 are transferred from the metal deposition portion 103 to the guiding roller 132 for traveling to cause a spark 171 as shown in FIG. 12, and this spark 171 causes a phenomenon of destroying the sheet 101A. It is to be noted that reference symbol 103X denotes a design or adhesive ink portion.

Furthermore, in a printing step for forming a transfer sheet, as shown in FIG. 13A, FIG. 13B, and FIG. 14, for example, a substrate sheet 102 of a printing sheet 101B, which has metal deposition portions 103B formed and exposed independently of each other in the shape of an island with use of a conductive metal (for example, aluminum), is wound off from a guiding roller 133 for winding off the sheet and passed through a plurality of guiding rollers 134 for traveling, and then, as the first step in the printing step, an insulating adhesive layer 103G is formed on the exposed metal deposition portions 103B in an adhesive layer application apparatus 135, thereby insulating the metal deposition portions 103B. Thereafter, a printed layer 103H is formed on the adhesive layer in a printing machine 136 subsequent to the adhesive layer application apparatus 135, and then, on exiting the printing machine 136, large static electricity is generated on the sheet 101B due to friction between guiding rollers 136 for traveling of the printing machine 137 and the sheet 101B. In this case, even if the sheet 101B has contact with the grounded metallic guiding rollers 137 for traveling, the metal deposition portion 103B is sandwiched between the insulating substrate sheet 102 and the insulating adhesive layer 103G and no portion of the metal deposition portion 103B itself is exposed. Therefore, the metal deposition portion 103B is not able to come in direct contact with the guiding rollers 137 for traveling, and the electric charges are hard to escape, and will be thus accumulated in the metal deposition portion 103B in the same way as in FIG. 1. Then, when the electric charges accumulated in the metal deposition portion exceeds a certain amount, the accumulated electric charges are transferred from the metal deposition portion 103B to the guiding roller 137 to cause a spark 171 in the same way as in FIG. 12, immediately before the metal deposition portion passes through the guiding roller for traveling, and this spark 171 causes a phenomenon of destroying the sheet 101B. A sideways T-shaped pattern in FIG. 15 refers to the trace of the spark 171 by which the metal deposition portion 103B has been damaged. It can be seen that the metal deposition portion 103B is damaged with the sideways T-shaped trace of the spark 171 caused, although the metal deposition portion 103B should exhibits metallic luster without such a pattern under normal circumstances.

Furthermore, in a molding step with use of a transfer sheet 101C with metal deposition portions 103 on a substrate sheet 102, as shown in FIG. 16A, FIG. 16B, and FIG. 17, the transfer sheet 101C is wound off from a guiding roller 138 for winding off the transfer sheet, passed through a guiding roller 139 for traveling, interposed between molds 141 for injection molding so that the transfer sheet 101C is opposed to a cavity 140 of the molds 141, and then injection molding of a synthetic resin 142 in the cavity 140 is carried out. In this case, while a metal such as aluminum constituting the metal deposition portions 103 of the transfer sheet 101C is normally electrically neutral, the molds 141 have positive electric charges 172 generated by friction between the synthetic resin 142 and the molds 141 in injection molding, as shown in FIG. 18. Then, as shown in FIG. 19, presence of a force pulling outward (for example, a force of the positive electric charges 172 generated in the molds 141) causes free electrons 173 in the metal deposition portion 103 to be drawn toward the positive electric charge side (the mold 141 side) (electrostatic induction) since the free electrons 173 in the metal deposition portion 103 are free to move, resulting in an electrical imbalance of distribution of the free electrons 173 in the metal deposition portion 103. Then, the positive electrical charges generated in the molds 141 draw the free electrons 173 in the aluminum of the metal deposition portion 103 toward the mold 141 side, resulting in polarization in the aluminum metal of the metal deposition portion 103. More specifically, the negative electric charges are accumulated in the molds 141 without any electric charges flowing to the grounded side of the molds 141. The negative electric charges thus generated are attracted to the positive electric charges of the molds by a strong attractive force. When polarization occurs in the metal of the metal deposition portion 103 as described above, a pulling force is also generated on the surface side of the substrate sheet 102 of the transfer sheet 101C to negatively charge the surface side of the substrate sheet 102 as shown in FIG. 20. Then, as shown in FIG. 21, with only the mold 141 (more specifically, the adhesive layer 103J or the injection-molded synthetic resin adjacent to the adhesive layer 103J) side grounded, the pulling force generated by the polarization inhibits the electric charges in the mold 141 from flowing to the grounded side to cause a defective static eliminating function or a significant decrease in static eliminating speed, leading to accumulation of the electric charges in the metal deposition portion 103C. Then, when the molded article of the synthetic resin is detached from the molds 141 by ejector pins, the positive electric charges of the molds 141 are released to the grounded side, while the negative electric charges of the metal deposition portion 103C, which have been bound to the positive electric charges, are released due to the weakened attractive force of the positive electric charges and transferred from an edge of the metal deposition portion 103, located closest to the mold 141, to the mold 141. Therefore, in the same way as in FIG. 12 (the grounded metallic guiding roller 132 corresponds to the mold 141), a spark 171 will be caused to damage the metal deposition portion 103C. A large number of recessed portions in FIG. 22 refer to the traces of the spark 171 by which the metal deposition portion 103C has been damaged. It can be seen that the metal deposition portion 103 is damaged with the large number of recessed traces of the spark 171 caused, although the metal deposition portion 103 should exhibit flat metallic luster without such a large number of recessed portions under normal circumstances.

Therefore, an object of the present invention is to solve the problems described above, and thus to provide a static eliminating sheet and a static eliminating system for sheets, which cause no spark, as well as a simultaneous design molding method, a printing method, and a deposition method using the static eliminating sheet.

Means for Resolving Issues

In order to achieve the object mentioned above, the present invention is configured as follows.

According to a first aspect of the present invention, there is provided a static eliminating sheet comprising:
a substrate sheet;
a plurality of design portions arranged independently from each other along a longitudinal direction of the substrate sheet and each including at least a conductive material portion; and
a band-shaped static eliminating band portion extending continuously along the longitudinal direction of the substrate sheet and electrically connecting the conductive material portions in the plurality of design portions to each other.

According to a second aspect of the present invention, there is provided the static eliminating sheet according to the first aspect, wherein the static eliminating band portion is located as a plurality of static eliminating band portions in a width direction of the substrate sheet.

According to a third aspect of the present invention, there is provided the static eliminating sheet according to the first or second aspect, wherein the conductive material portion is a conductive metal deposition portion.

According to a fourth aspect of the present invention, there is provided the static eliminating sheet according to any one of the first to third aspects, wherein the conductive material portion is electrically connected to the static eliminating band portion via an auxiliary static eliminating band portion.

According to a fifth aspect of the present invention, there is provided the static eliminating sheet according to any one of the first to fourth aspects, wherein the static eliminating band portion has, at an end of the substrate sheet, a grounded portion which is able to be brought into contact with a conductive roller for guiding the static eliminating sheet.

According to a sixth aspect of the present invention, there is provided the static eliminating sheet according to any one of the first to fifth aspects, the static eliminating sheet is a sheet for forming a transfer sheet, for use in a printing step.

According to a seventh aspect of the present invention, there is provided the static eliminating sheet according to any one of the first to fifth aspects, the static eliminating sheet is a transfer sheet for simultaneous design molding, for use in a simultaneous design molding step.

According to an eighth aspect of the present invention, there is provided a printing method comprising a printing step for further forming a design portion on the static eliminating sheet in a state in which the grounded portion of the static eliminating sheet according to the fifth aspect is grounded in contact with the conductive roller for guiding the static eliminating sheet.

According to a ninth aspect of the present invention, there is provided a simultaneous design molding method comprising a simultaneous design molding step that is carried out in a state in which the static eliminating sheet according to the fifth aspect is used as a transfer sheet for simultaneous design molding and the grounded portion is grounded in contact with the conductive roller for guiding the static eliminating sheet.

According to a tenth aspect of the present invention, there is provided a static eliminating sheet comprising:
a substrate sheet;
a plurality of design portions arranged independently from each other along a longitudinal direction of the substrate sheet and each including at least a conductive material portion; and
a band-shaped static eliminating band portion located continuously along the longitudinal direction of the substrate sheet and near the plurality of design portions.

According to an 11th aspect of the present invention, there is provided the static eliminating sheet according to the tenth aspect, wherein the conductive material portion is a conductive ink portion.

According to a 12th aspect of the present invention, there is provided the static eliminating sheet according to the tenth or 11th aspect, wherein the static eliminating band portion has, at an end of the substrate sheet, a grounded portion which is able to be brought into contact with a conductive roller for guiding the static eliminating sheet.

According to a 13th aspect of the present invention, there is provided a deposition method comprising a deposition step for further forming a metal deposition portion on the substrate sheet is carried out in a state in which the static eliminating sheet according to the 12th aspect is used and the grounded portion is grounded in contact with the conductive roller for guiding the static eliminating sheet.

According to a 14th aspect of the present invention, there is provided a static eliminating system for sheets, comprising:

the static eliminating sheet according to the fifth aspect; and a conductive roller for guiding the static eliminating sheet, the conductive roller guiding the travel of the static eliminating sheet and coming into contact with the grounded portion of the static eliminating sheet so that the grounded portion of the static eliminating sheet is grounded.

Effects of Invention

The static eliminating sheet and the static eliminating system for sheets, as well as the simultaneous design molding method, the printing method, and the deposition method using the static eliminating sheet, according to the present invention, can fulfill the static eliminating function of discharging charges in the conductive material portion by continuously locating the static eliminating band portion for connecting the conductive material portions of the design portions in the longitudinal direction of the sheet, thereby realizing prevention of sparks with certainty.

BRIEF DESCRIPTION OF THE DRAWINGS

These and other objects and features of the present invention will become clear from the following description taken in conjunction with the preferred embodiments thereof with reference to the accompanying drawings, in which:

FIG. 5 is an explanation view of a case in which the static eliminating sheet for printing steps according to the second embodiment of the present invention is used in a printing step;

FIG. 8 is a view in a table form, which shows the relationship between the width of a static eliminating band portion and the amount of electrification in the first to third embodiments;

FIG. 10 is an explanation view of a case in which the conventional deposition sheet in FIG. 9A is used in a deposition step;

DESCRIPTION OF EMBODIMENTS

Static eliminating sheets and static eliminating systems for sheets, as well as simultaneous design molding methods, printing methods, and deposition methods using the static eliminating sheets, according to embodiments of the present invention, will be described in detail with reference to the drawings.

It is to be noted that the static eliminating system for sheets refers to an apparatus including: a static eliminating sheet; and a conductive roller for guiding the static eliminating sheet, which guides the traveling static eliminating sheet and comes into contact with the grounded portion of the static eliminating sheet for grounding, and more specifically, refers to an apparatus which allows the simultaneous design molding method, the printing method, and the deposition method to be carried out.

First Embodiment

Figure 1A:
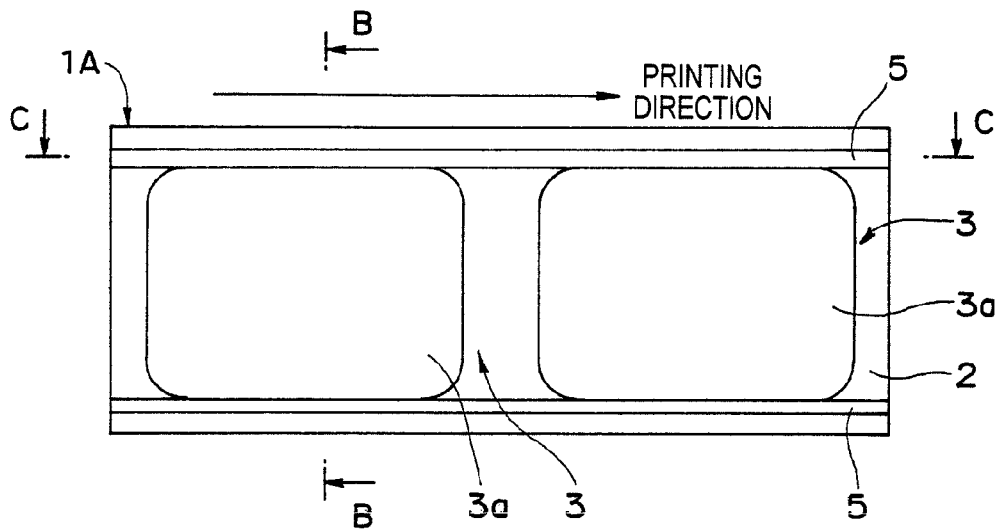
FIG. 1A is a plan view of a static eliminating sheet for deposition steps according to a first embodiment of the present invention.
Figure 1B:
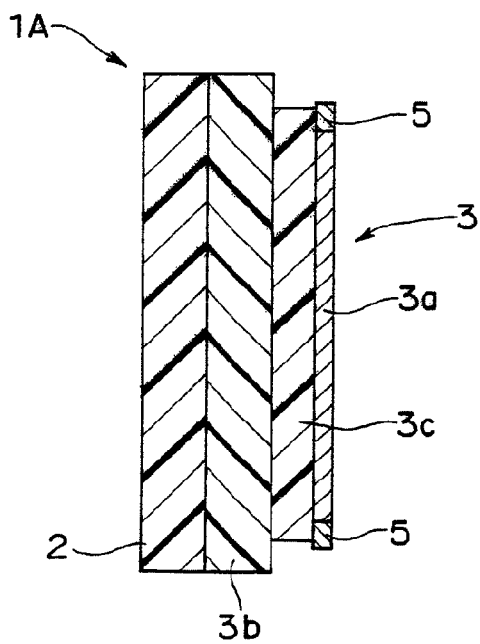
FIG. 1B is a cross-sectional view taken along the line B-B in FIG. 1A of the static eliminating sheet for deposition steps according to the first embodiment of the present invention.
Figure 1C:
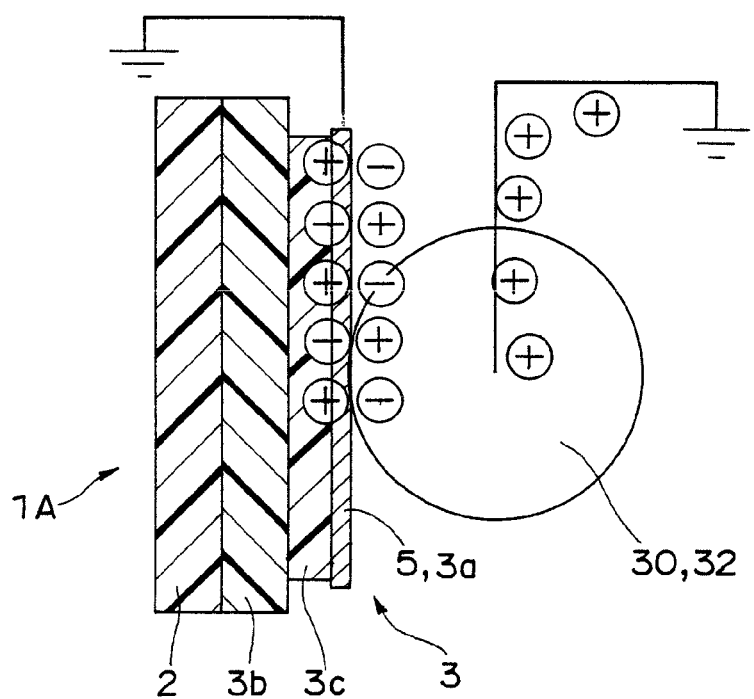

A static eliminating sheet 1 according to a first embodiment of the present invention refers to a static eliminating sheet LA for deposition steps for use in a deposition step of a simultaneous design molding method, which is configured to include at least a substrate sheet 2 formed from an insulating synthetic resin or the like, a plurality of design portions 3 arranged independently from each other along the longitudinal direction of the substrate sheet 2 and each including at least a conductive material portion 3a, and a band-shaped static eliminating band portion 5 extending continuously along the longitudinal direction of the substrate sheet 2 and located near the plurality of design portions 3, as shown in FIGS. 1A to 1C. As this sheet for use in deposition steps, each design portion 3 may or may not be connected to the static eliminating band portion 5.

The conductive material portion 3a is composed of, for example, a conductive ink portion.

The design portion 3 is not limited to one layer, and for example, may be formed from five layers, as shown in FIGS. 1A and 1B. More specifically, the design portion is composed of an insulating first adhesive layer 3b removably adhered to the substrate sheet 2, an insulating first design portion 3c, and the conductive material portion 3a. The first adhesive layer 3b and the first design portion 3c adjacent to each other are adhered to each other through the bonding function of the first adhesive layer 3b. The first design portion 3c and the conductive material portion 3a adjacent to each other are adhered to each other through the bonding function of either the first design portion 3c or the conductive material portion 3a.

It is preferable that the static eliminating band portion 5 has, at an end, preferably, a rear end (an edge to be wound off last) of the substrate sheet 2, a grounded portion 5a (see FIG. 3B) which is able to be brought into contact with a grounded conductive roller 30 (see FIG. 3A) for guiding the static eliminating sheet. In order to easily bring the grounded portion 5a into contact with the conductive roller 30 for guiding the static eliminating sheet, the grounded portion 5a may be formed at the end of the static eliminating band portion 5 so as to have the same width and thickness as those of the portion of the static eliminating band portion other than the grounded portion 5a, or only the grounded portion 5a may be formed so as to have a larger width or thickness than that of the portion of the static eliminating band portion other than the grounded portion 5a.

Figure 2A:
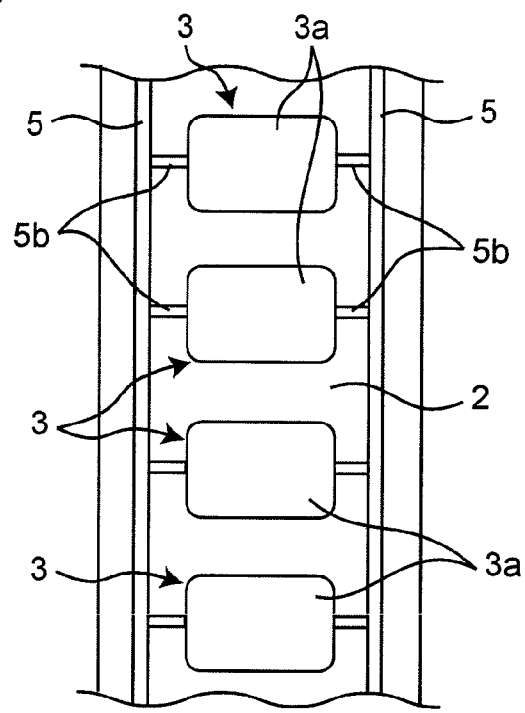
FIG. 2A is a plan view illustrating another aspect of a static eliminating sheet according to the first to third embodiments of the present invention.
Figure 2B:
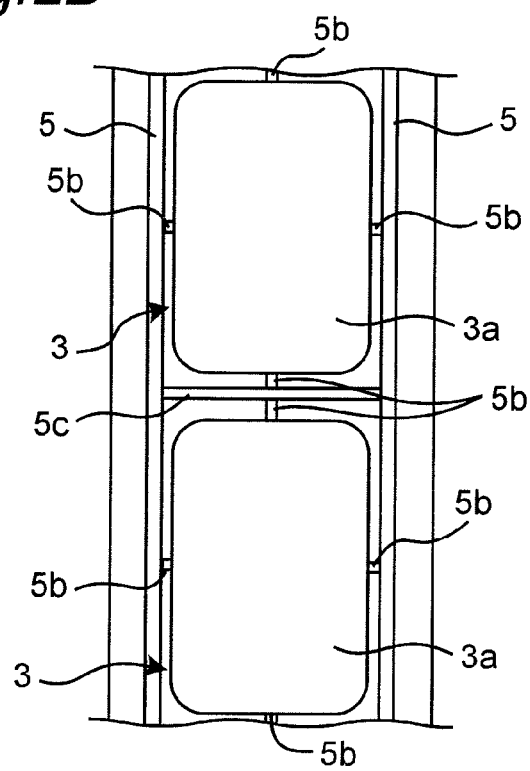
FIG. 2B is a plan view illustrating yet another aspect of a static eliminating sheet according to the first to third embodiments of the present invention.
Figure 2C:
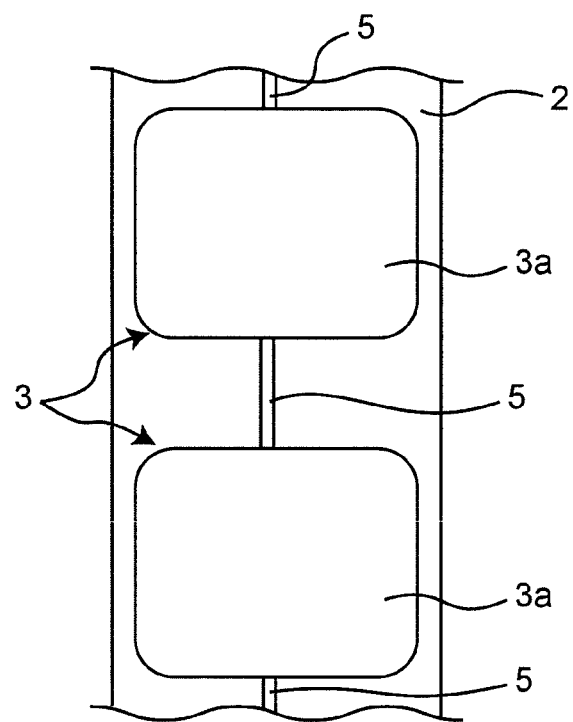
FIG. 2C is a plan view illustrating yet another aspect of a static eliminating sheet according to the first to third embodiments of the present invention.

How to locate the static eliminating band portion 5 is not to be considered limited to the case of FIG. 1A, and various aspects are conceivable as shown in FIGS. 2A to 2C.

For example, in FIG. 2A, the static eliminating band portion 5 and the conductive material portion 3a may be electrically connected via an auxiliary static eliminating band portion 5b extending along the sheet width direction, rather than connecting the static eliminating band portion 5 and the conductive material portion 3a directly to each other. The auxiliary static eliminating band portion 5b is located along the sheet width direction perpendicular to the longitudinal direction of the static eliminating band portion 5, and may have the same width and thickness as those of the static eliminating band portion 5, or only the width of the static eliminating band portion 5 may be made slightly smaller. It is preferable that the auxiliary static eliminating band portion 5b is made of the same material as that of the static eliminating band portion 5 in terms of reduction in the manufacturing cost and the number of steps.

Alternatively, as shown in FIG. 2B, a coupling portion 5c for coupling two opposite static eliminating band portions 5 directly along the sheet width direction may be provided between adjacent conductive material portions 3a, in addition to the auxiliary static eliminating band portion 5b in FIG. 2A. As described above, it is preferable that the coupling portion 5c further arranged can expand the static eliminating band portion (to the extent that there is a small risk of defects in printing), thereby allowing the path for the flow electricity to be expanded as much as possible.

Alternatively, as shown in FIG. 2C, one static eliminating band portion 5 may be provided so as to couple adjacent conductive material portions 3a, rather than providing two static eliminating band portions 5. With such a configuration, it is not necessary to secure a region for forming the static eliminating band portion 5 additionally on the sides of the conductive material portions 3a, and the width of the conductive material portion 3a can be increased close to the width of the sheet, thereby enhancing the degree of freedom in design. Furthermore, since the static eliminating band portion 5 may be located only between the adjacent conductive material portions 3a, the manufacturing cost can be reduced as compared with cases in which the static eliminating band portion 5 is formed over the entire length of the substrate sheet 2.

Figure 3A:
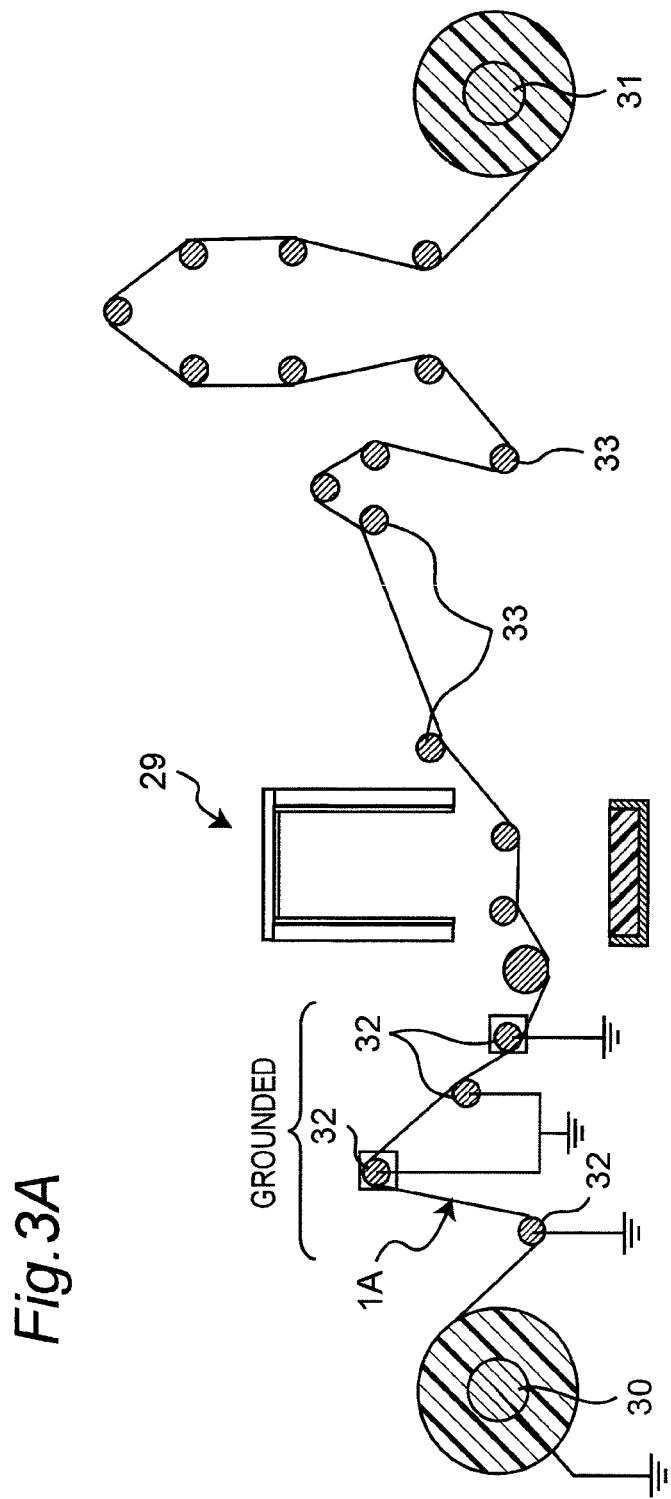
FIG. 3A is an explanation view of a case in which the static eliminating sheet for deposition steps according to the first embodiment of the present invention is used in a deposition step.
Figure 3B:
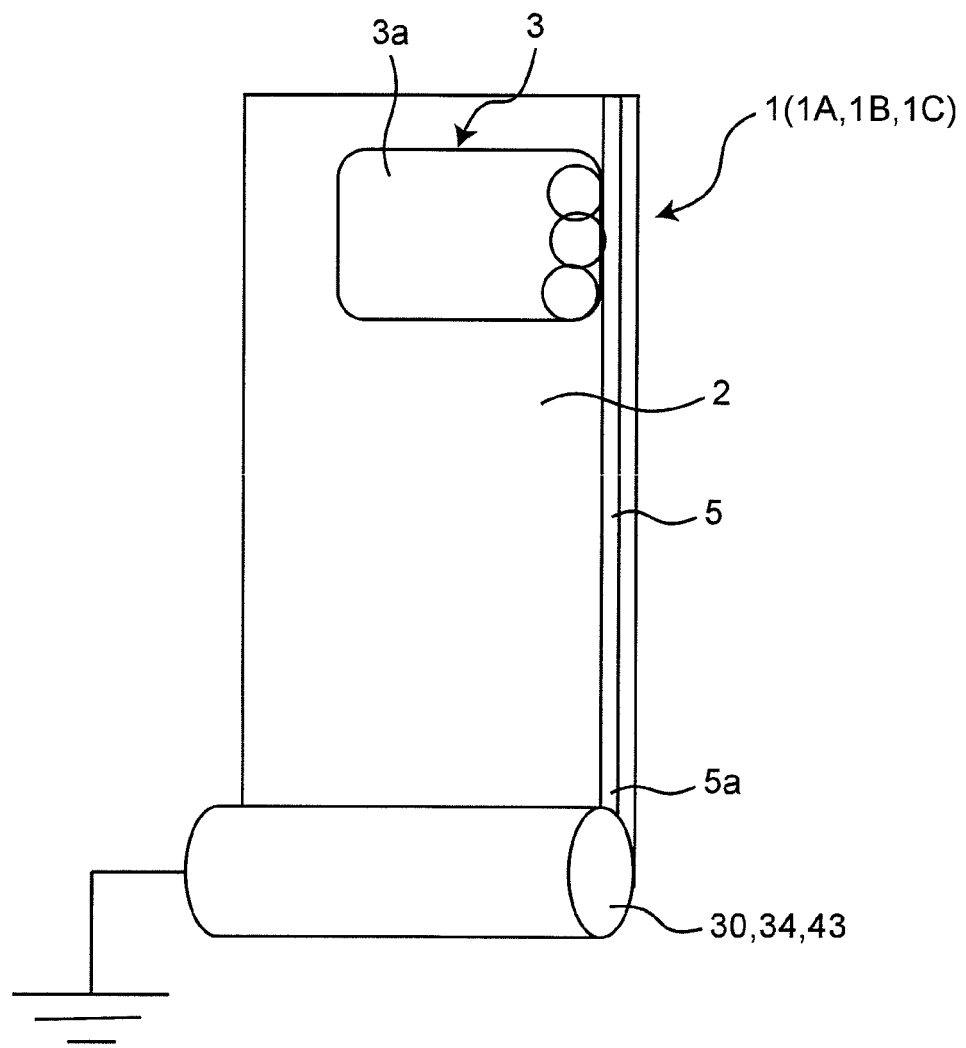
FIG. 3B is an explanation view for explaining the relationship between the static eliminating sheet according to one the first to third embodiment of the present invention and a roller.

In a deposition step using the static eliminating sheet 1A for deposition steps, as shown in FIG. 3A, the grounded portion 5a of the static eliminating band portion 5 located at the rear end of the substrate sheet 2 is brought into direct contact with the grounded conductive roller 30 for guiding the static eliminating sheet, and the sheet 1A wound off from the conductive roller 30 for guiding the sheet is caused to travel through a large number of grounded guiding rollers 32 for traveling and a large number of guiding rollers 33 for traveling toward a guiding roller 31 for taking up the sheet. Reference numeral 29 denotes a deposition apparatus, and the deposition apparatus 29 is used to form a metal deposition layer 4 onto the design portion 3.

In this deposition step, the grounded portion 5a as the end of the static eliminating band portion 5 is grounded in direct contact with the grounded conductive roller 30 for guiding the static eliminating sheet, and the static eliminating band portion 5 formed over the entire length of the sheet 1A is grounded in direct contact with the grounded guiding rollers 32 for traveling disposed between the conductive roller 30 for guiding the sheet and the deposition apparatus 29. Therefore, even if electric charges are generated due to friction between the conductive material portion 3a and the guiding rollers 33 for traveling, to be accumulated in the conductive material portion 3a, the electric charges flow from the conductive material portion 3a through the static eliminating band portion 5 to the grounded guiding rollers 32 for traveling, or to the grounded guiding rollers 32 for traveling and the grounded conductive roller 30 for guiding the sheet (see FIG. 1C), resulting in no accumulation of the electric charges in the conductive material portions 3a. Thus, the trouble that the electric charges accumulated in a metal deposition portion are transferred to a guiding roller for traveling to cause sparks as in a conventional case can be prevented with certainty. Therefore, the deposition apparatus 29 can be used to carry out in a stable manner the deposition step for forming a metal deposition layer on the conductive material portion 3a in the design portion 3 on the substrate sheet 2. This advantageous effect is quite effective for, in particular, large-area conductive material portions 3a or metal deposition portions (for example, portions with the area per 1 m of film being 500 cm$^2$ or more) and conductive material portions 3a or metal deposition portions isolated in the insulating substrate sheet 2 (island-shaped portions arranged to be isolated).

Second Embodiment

Figure 4A:
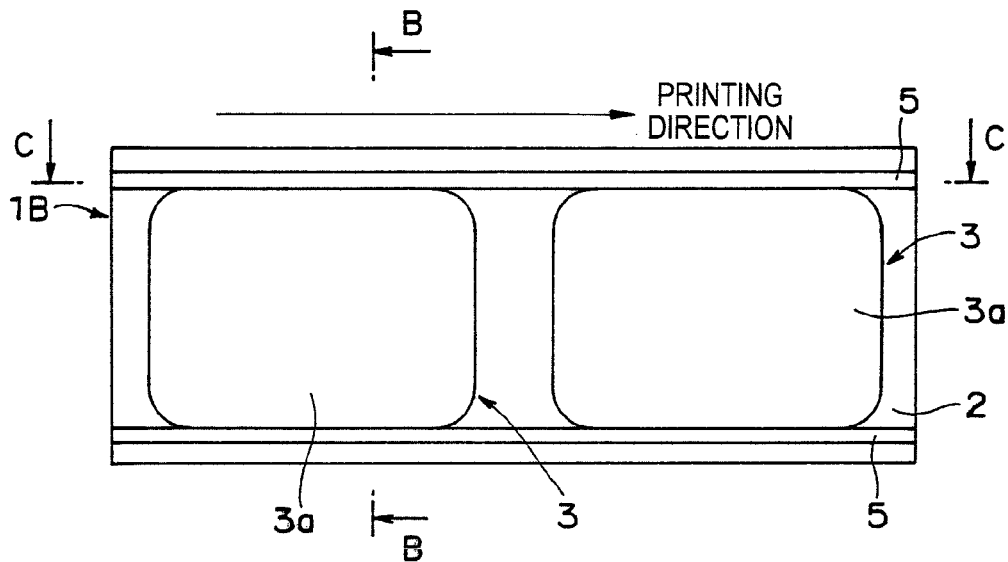
FIG. 4A is a plan view of a static eliminating sheet for printing steps according to a second embodiment of the present invention.
Figure 4B:
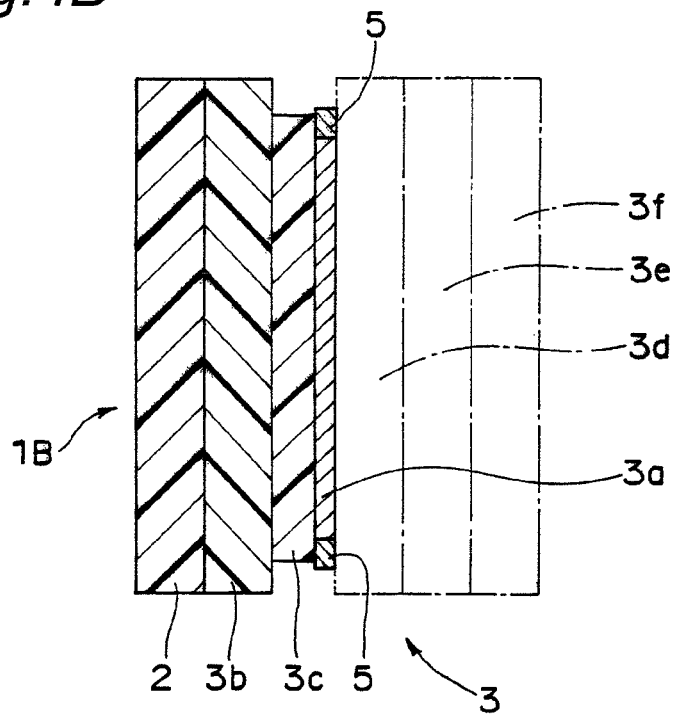
FIG. 4B is a cross-sectional view taken along the line B-B in FIG. 4A of the static eliminating sheet for printing steps according to the second embodiment of the present invention.
Figure 4C:
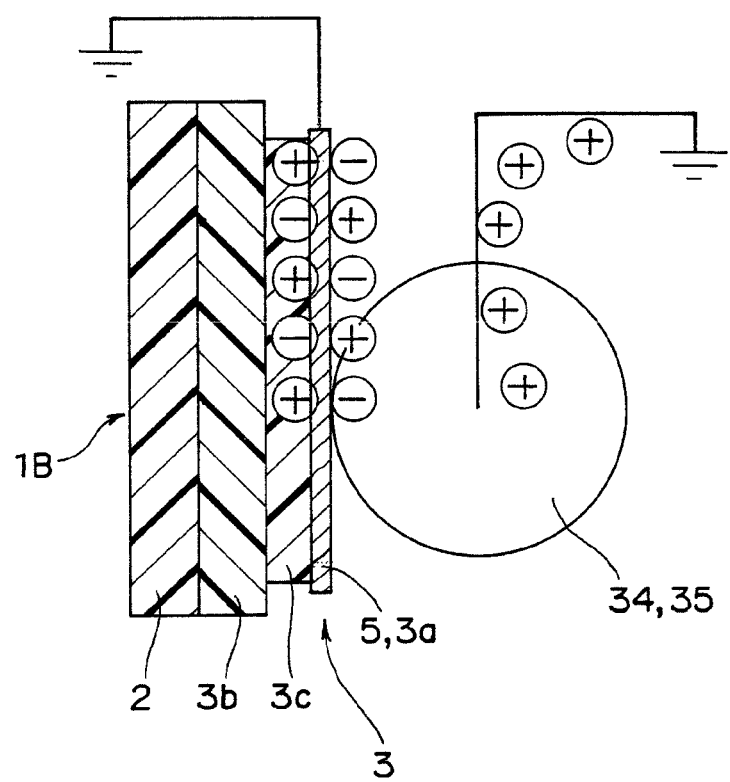
FIG. 4C is a cross-sectional view taken along the line C-C in FIG. 4A of the static eliminating sheet for printing steps, being guided by a guiding roller, for explaining the relationship between the static eliminating sheet for printing steps according to the second embodiment of the present invention and the guiding roller.

A static eliminating sheet 1 according to a second embodiment of the present invention refers to a static eliminating sheet 1B for printing steps, for use in printing steps, which is configured to include at least a substrate sheet 2 formed from an insulating synthetic resin or the like, a plurality of design portions 3 arranged independently from each other along the longitudinal direction of the substrate sheet 2 and each including at least a conductive material portion 3a, and two band-shaped static eliminating band portions 5 extending continuously along the longitudinal direction of the substrate sheet 2 and located in contact with opposite edges of each of design portions 3, as shown in FIGS. 4A to 4C. As this sheet for use in printing steps, each of the design portions 3 and the static eliminating band portions 5 are definitely connected to each other.

In this printing step, a second adhesive layer 3d, a second design portion 3e, and a third adhesive layer 3f to be fixed to a molded resin 7 are further formed and laminated sequentially on the conductive material portion 3a to complete a transfer sheet. The conductive material portion 3a and the second adhesive layer 3d adjacent to each other are adhered to each other through the bonding function of the second adhesive layer 3d. The second adhesive layer 3d and the second design portion 3e adjacent to each other are adhered to each other through the bonding function of the second adhesive layer 3d. The second design portion 3e and the third adhesive layer 3f adjacent to each other are adhered to each other through the bonding function of the third adhesive layer 3f. It is to be noted that, while the number of layers formed in the printing step is three in this example, the present invention is not to be considered limited to this structure, and any number of layers can be formed by printing.

The conductive material portion 3a is composed of, for example, a conductive ink portion or a conductive metal deposition portion.

It is preferable that, in the same way as in the first embodiment described previously, the static eliminating band portions 5 each have, at an end, preferably, a rear end (an edge to be wound off last) of the substrate sheet 2, a grounded portion 5a (see FIG. 3B) which is able to be brought into contact with a conductive roller 34 (see FIG. 5) for guiding the static eliminating sheet. In order to easily bring the grounded portion 5a into contact with the grounded conductive roller 34 for guiding the static eliminating sheet, the grounded portion 5a may be formed at the end of the static eliminating band portion 5 so as to have the same width and thickness as those of the portion except the grounded portion 5a, or only the grounded portion 5a may be formed so as to have a larger width or thickness than that of the portion except the grounded portion 5a.

How to locate the static eliminating band portion 5 is not to be considered limited to the case of FIG. 4A, and various aspects are conceivable as shown in FIGS. 2A to 2C, as described in the first embodiment.

In a printing step using the static eliminating sheet 1B for printing steps, as shown in FIG. 5, the grounded portion 5a of the static eliminating band portion 5 located at the rear end of the substrate sheet 2 is brought into direct contact with the grounded conductive roller 34 for guiding the static eliminating sheet, and the sheet 1A wound off from the conductive roller 34 for guiding the sheet is caused to travel through a large number of grounded guiding rollers 35 for traveling and a large number of guiding rollers 37 for traveling toward a guiding roller 39 for taking up the sheet. Reference numeral 36 denotes an apparatus for forming the second adhesive layer, and the apparatus 36 for forming the second adhesive layer is used to form and laminate the second adhesive layer 3d on the conductive material portion 3a. Reference numeral 38 denotes an apparatus for forming the second design portion, and the apparatus 38 for forming the second design portion is used to form and laminate the second design portion 3e on the second adhesive layer 3d. Thereafter, not shown in FIG. 5, an apparatus placed for forming the third adhesive layer, which is similar to the apparatus 36 for forming the second adhesive layer, is arranged and used to form and laminate the third adhesive layer 3f on the second design portion 3e.

In this printing step, the grounded portion 5a at the end of the static eliminating band portion 5 is grounded in direct contact with the grounded conductive roller 34 for guiding the static eliminating sheet, and the static eliminating band portion 5 formed and exposed over the entire length of the sheet 1A is grounded in direct contact with the grounded guiding rollers 35 for traveling disposed in a pre-printing step zone I between the conductive roller 34 for guiding the sheet and the apparatus 36 for forming the adhesive layer. Therefore, even if electric charges are generated due to friction between the sheet such as the conductive material portion 3a and the apparatus 36 for forming the adhesive layer or the guiding rollers 37 for traveling in a printing step zone II, to be accumulated in the conductive material portion 3a, the electric charges flow from the conductive material portions 3a to the static eliminating band portion 5, and further the electric charges flow from the static eliminating band portion 5 to the grounded guiding rollers 35 for traveling, or to the grounded guiding rollers 35 for traveling and the grounded conductive roller 34 for guiding the sheet (see FIG. 4C), resulting in no accumulation of the electric charges in the conductive material portion 3a. Thus, the trouble that the electric charges accumulated in the conductive material portion 3a is transferred to a guiding roller for traveling to cause sparks as caused conventionally can be prevented with certainty. Therefore, in the printing step zone II, the apparatus 36 for forming the second adhesive layer, the apparatus 36 for forming the second design portion, and the apparatus for forming the third adhesive layer can be used to print and laminate the second adhesive layer 3d, the second design portion 3e, and the third adhesive layer 3f sequentially in a stable manner in the design portion 3 on the substrate sheet 2. More specifically, even if large static electricity is caused in the sheet 1B at the last stage in the printing step zone II, the electric charges are escaped through the static eliminating band portion 5 to the pre-printing step zone I before formation of the adhesive and grounded, thereby allowing the static electricity to be eliminated with certainty. This advantageous effect is quite effective for, in particular, large-area conductive material portions 3a (for example, portions with the area per 1 m of film being 500 $cm^2$ or more) and conductive material portions 3a isolated in the insulating substrate sheet 2 (island-shaped portions isolated and arranged). Furthermore, in the step of printing the transfer sheet 1B, the static eliminating band portions 5 are provided on the opposite ends of each of the plurality of design portions formed on the substrate sheet 2, and the transfer sheet 1B is configured so that the guiding rollers and the static eliminating band portions 5 surround the design portions 3. Thus, the static eliminating band portions 5 and the guiding rollers serve as a Faraday cage so that the design portion 3 produces no large electric potential difference while passing through the guiding rollers 35 for traveling, thereby preventing the transfer sheet 1B from being damaged (due to free discharge caused).

Third Embodiment

Figure 6A:
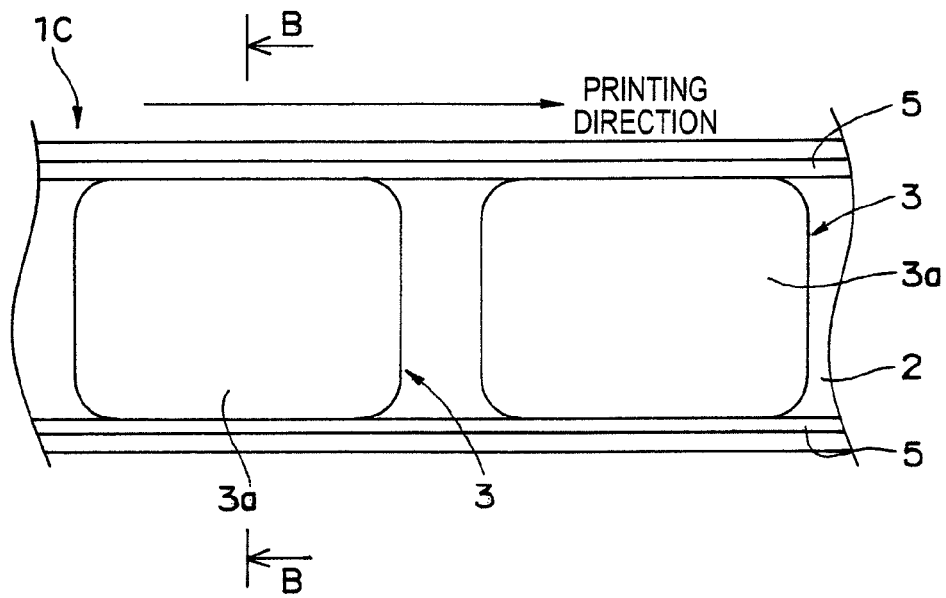
FIG. 6A is a plan view of a static eliminating sheet for simultaneous design molding steps according to the third embodiment of the present invention.
Figure 6B:
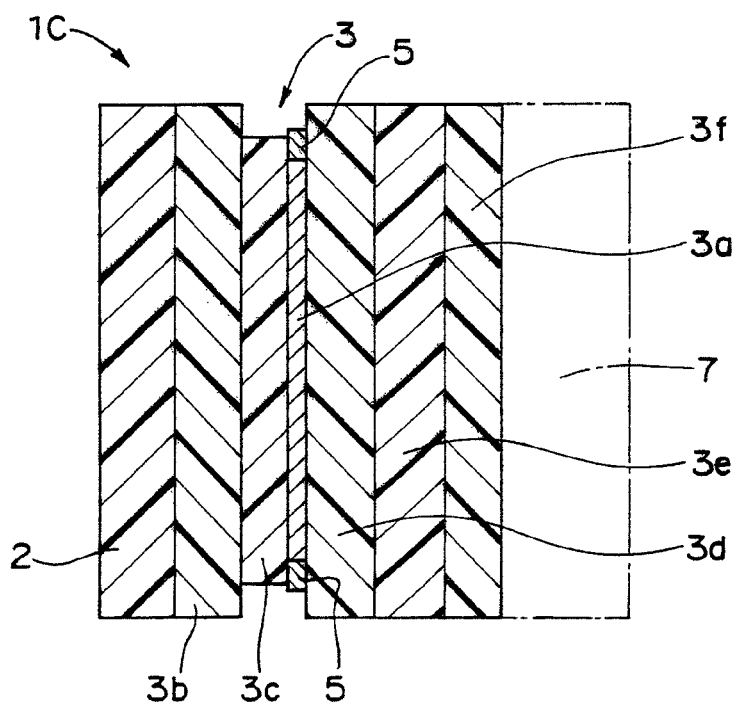
FIG. 6B is a cross-sectional view taken along the line B-B in FIG. 6A of the static eliminating sheet for simultaneous design molding steps according to the third embodiment of the present invention.
Figure 6C:
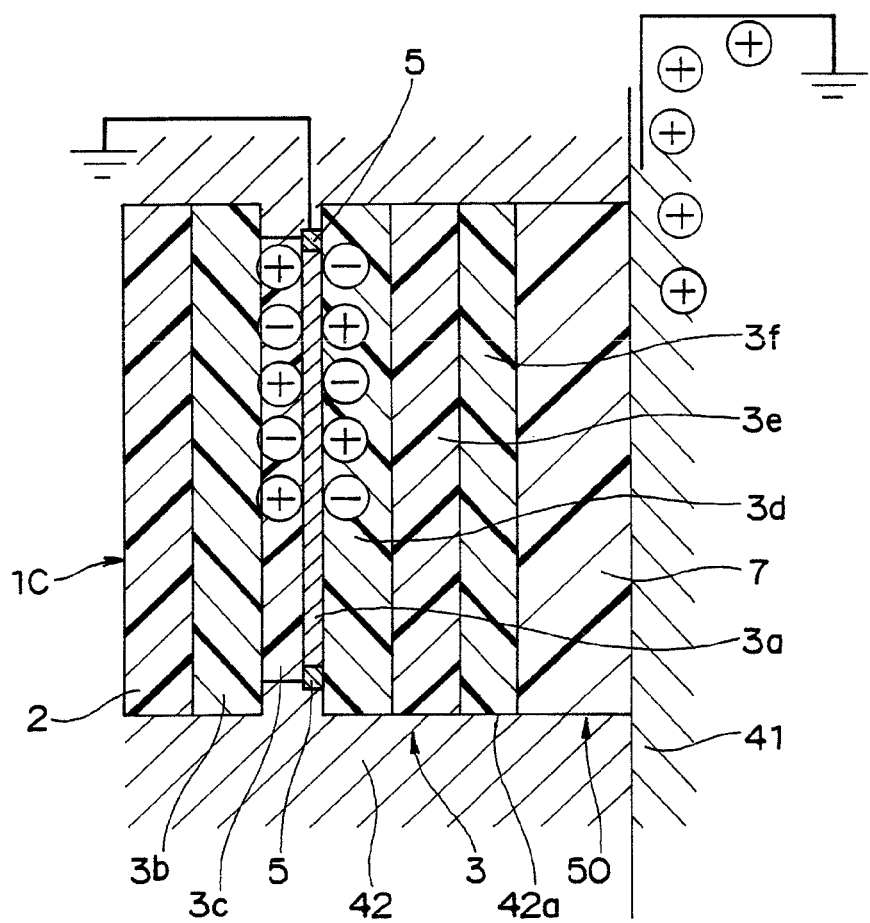
FIG. 6C is a cross-sectional view taken along the line C-C in FIG. 6A in a state in which simultaneous design molding is being carried out with the static eliminating sheet for simultaneous design molding steps interposed between molds, for explaining the relationship between the static eliminating sheet for simultaneous design molding steps according to the third embodiment of the present invention and the molds.

A static eliminating sheet 1 according to a third embodiment of the present invention refers to a static eliminating sheet 1C for simultaneous design molding steps, for use in simultaneous design molding steps, which is configured to include at least a substrate sheet 2 formed from an insulating synthetic resin or the like, a plurality of design portions 3 arranged independently from each other along the longitudinal direction of the substrate sheet 2 and each including at least a conductive material portion 3a, and two band-shaped static eliminating band portions 5 extending continuously along the longitudinal direction of the substrate sheet 2 and located in contact with opposite edges of each of the design portions 3, as shown in FIGS. 6A to 6C. As this sheet for use in printing steps, each design portion 3 and the static eliminating band portions 5 are definitely connected to each other.

The design portions 3 are not limited to having one layer, and for example, may be composed of six layers as shown in FIG. 6A to 6C. More specifically, the design portion 3 is composed of a first adhesive layer 3b removably adhered to the substrate sheet 2, a first design portion 3c, the conductive material portion 3a, a second adhesive layer 3d, a second design portion 3e, and a third adhesive layer 3f to be fixed to a molded resin 7. The first adhesive layer 3b and the first design portion 3c adjacent to each other are adhered to each other through the bonding function of the first adhesive layer 3b. The first design portion 3c and the conductive material portion 3a adjacent to each other are adhered to each other through the bonding function of either the first design portion 3c or the conductive material portion 3a. The conductive material portion 3a and second adhesive layer 3d adjacent to each other are adhered to each other through the bonding function of the second adhesive layer 3d. The second adhesive layer 3d and the second design portion 3e adjacent to each other are adhered to each other through the bonding function of the second adhesive layer 3d. The second design portion 3e and the third adhesive layer 3f adjacent to each other are adhered to each other through the bonding function of the third adhesive layer 3f. It is to be noted that, while the number of layers formed in the simultaneous design molding step is six in this example, the present invention is not to be considered limited to this structure, and any number of layers can be formed by printing.

The conductive material portion 3a is composed of, for example, a conductive ink portion or a conductive metal deposition portion.

It is preferable that, in the same way as in the first embodiment described previously, the static eliminating band portions 5 each have, at an end, preferably, a rear end (an edge to be wound off last) of the substrate sheet 2, a grounded portion 5a (see FIG. 3B) which is able to be brought into contact with a conductive roller 43 (see FIG. 7) for guiding the static eliminating sheet. In order to easily bring the grounded portion 5a into contact with the grounded conductive roller 43 for guiding the static eliminating sheet, the grounded portion 5a may be formed at the end of the static eliminating band portion 5 so as to have the same width and thickness as those of the portion except the grounded portion 5a, or only the grounded portion 5a may be formed so as to have a larger width or thickness than that of the portion except the grounded portion 5a.

How to locate the static eliminating band portions 5 is not to be considered limited to the case of FIG. 6A, and various aspects are conceivable as shown in FIGS. 2A to 2C, described in the first embodiment.

Figure 7:
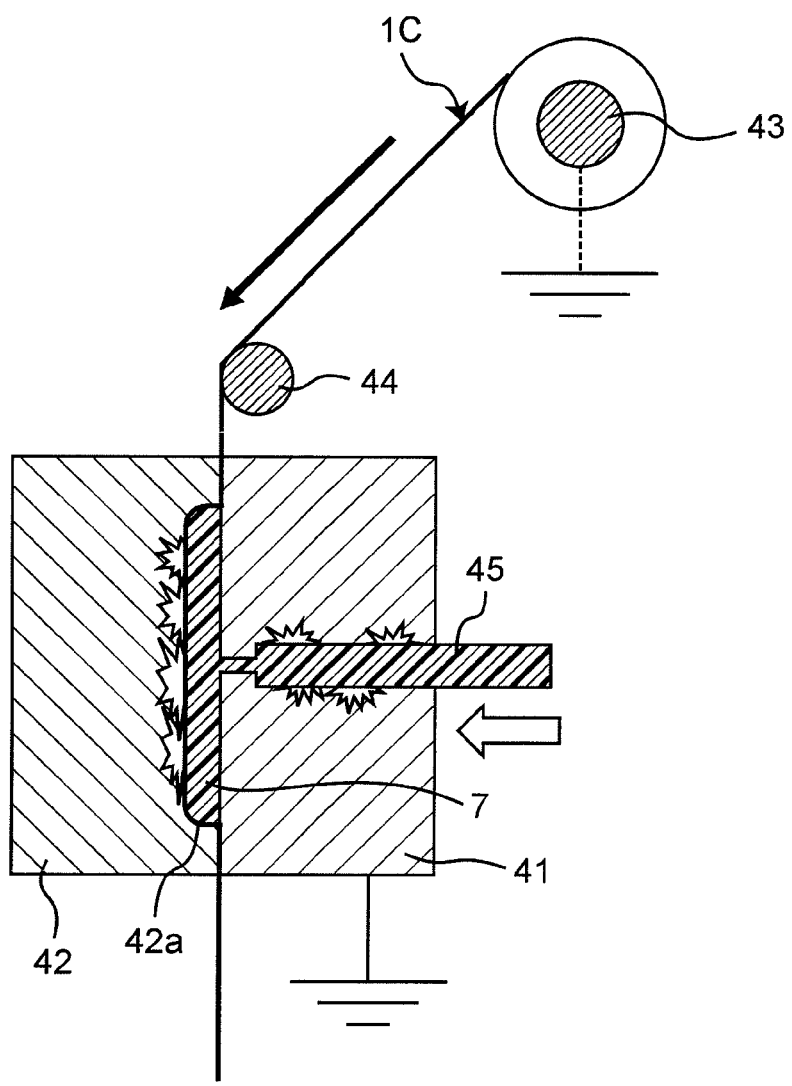
FIG. 7 is an explanation view of a case in which the static eliminating sheet for simultaneous design molding steps according to the third embodiment of the present invention is used in a simultaneous design molding step.
Figure 9A:
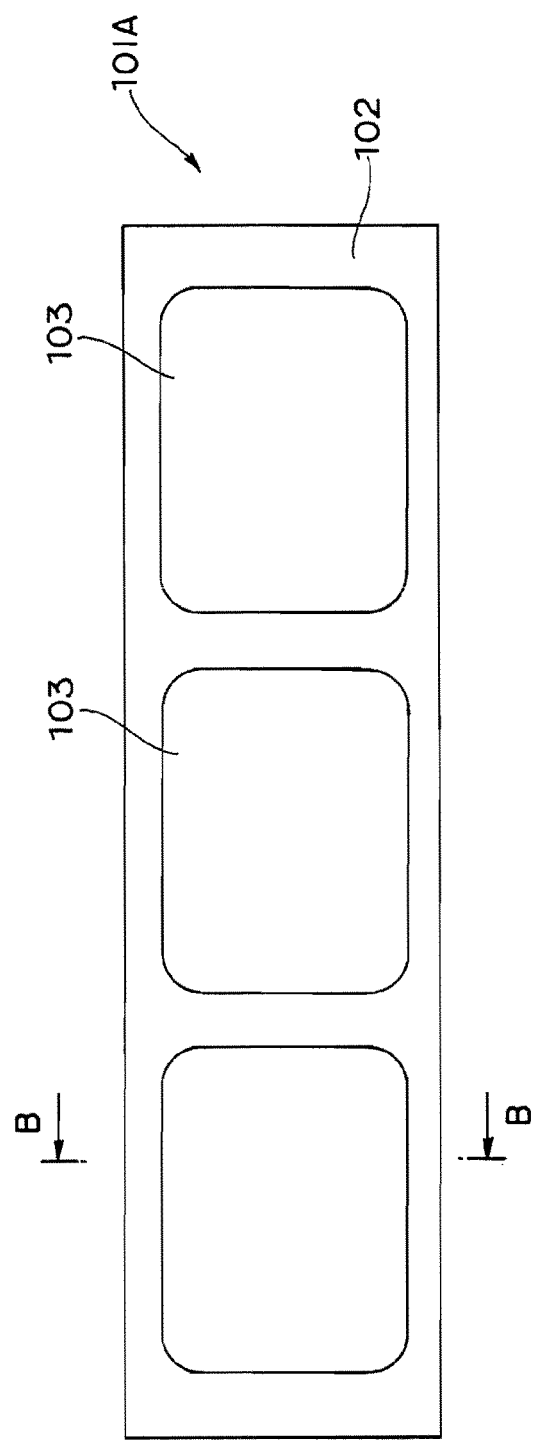
FIG. 9A is a plan view of a conventional deposition sheet for using a nonconductive metal for metal deposition.
Figure 9B:
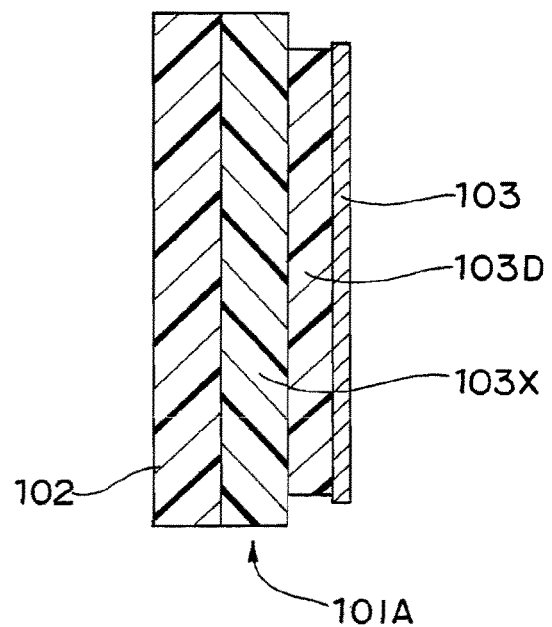
FIG. 9B is a cross-sectional view of FIG. 9A along the line B-B.
Figure 10:
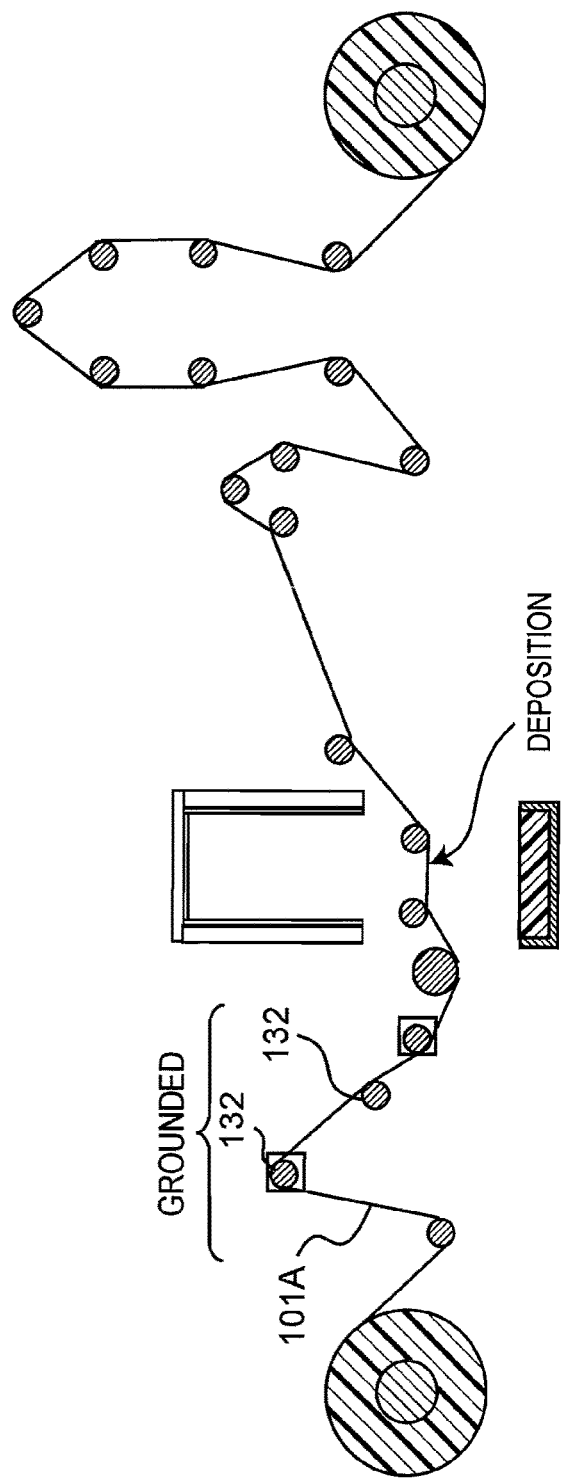
FIG. 10 is a cross-sectional view taken along the line C-C in FIG. 1A of the static eliminating sheet for deposition steps, being guided by a guiding roller, for explaining the relationship between the static eliminating sheet for deposition steps according to the first embodiment of the present invention and the guiding roller.
Figure 11:
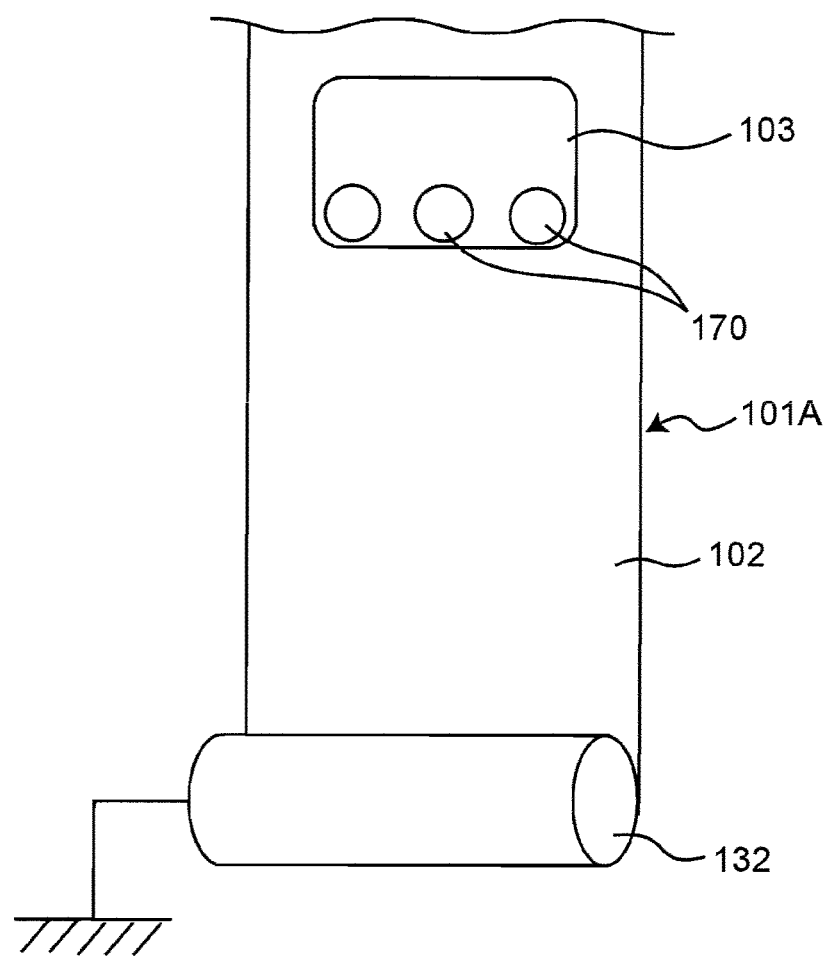
FIG. 11 is an explanation view of a state in which electric charges are generated due to friction between a metal deposition portion and a guiding roller and accumulated in the metal deposition portion.
Figure 12:
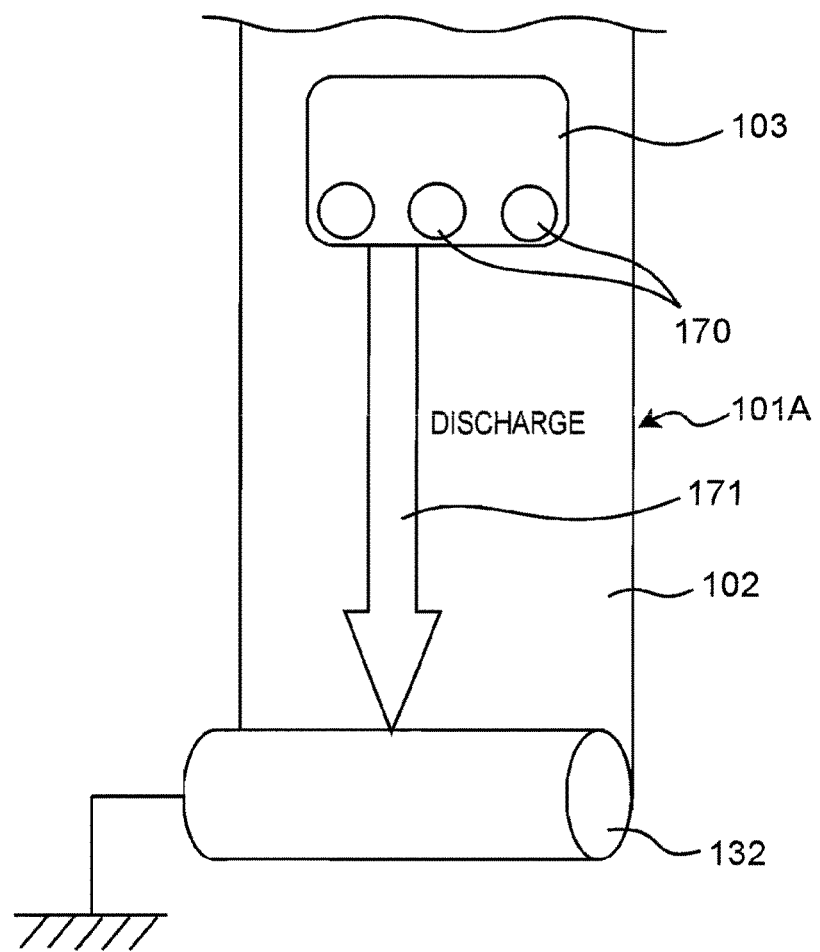
FIG. 12 is an explanation view of a state in which the electric charges accumulated in FIG. 11 are transferred from the metal deposition portion to the guiding roller for traveling to cause a spark.
Figure 13A:
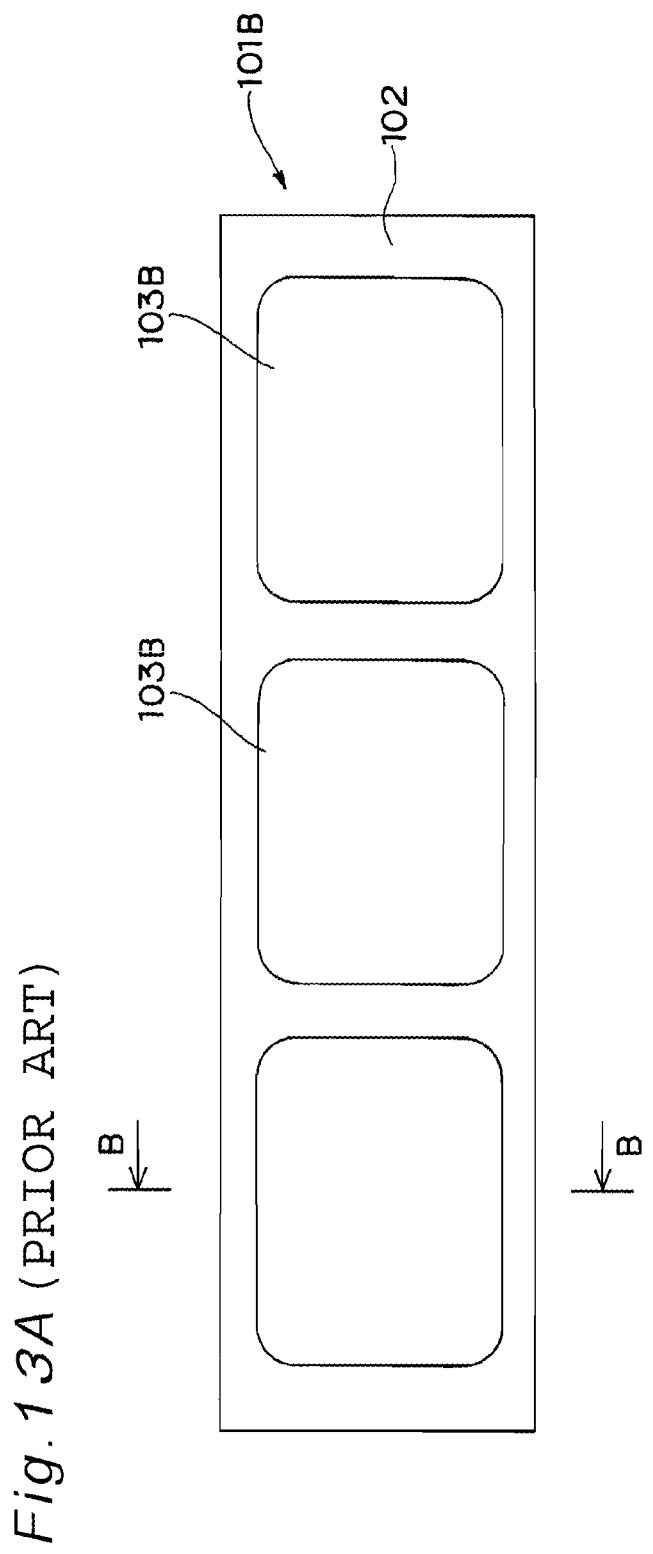
FIG. 13A is a plan view of a conventional sheet for use in a printing step for forming a transfer sheet.
Figure 13B:
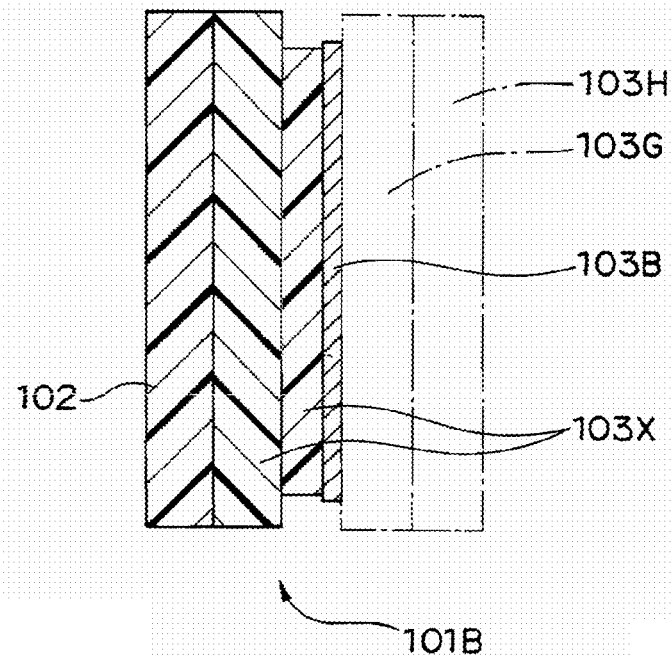
FIG. 13B is a cross-sectional view of FIG. 13A taken along the line B-B therein.
Figure 14:
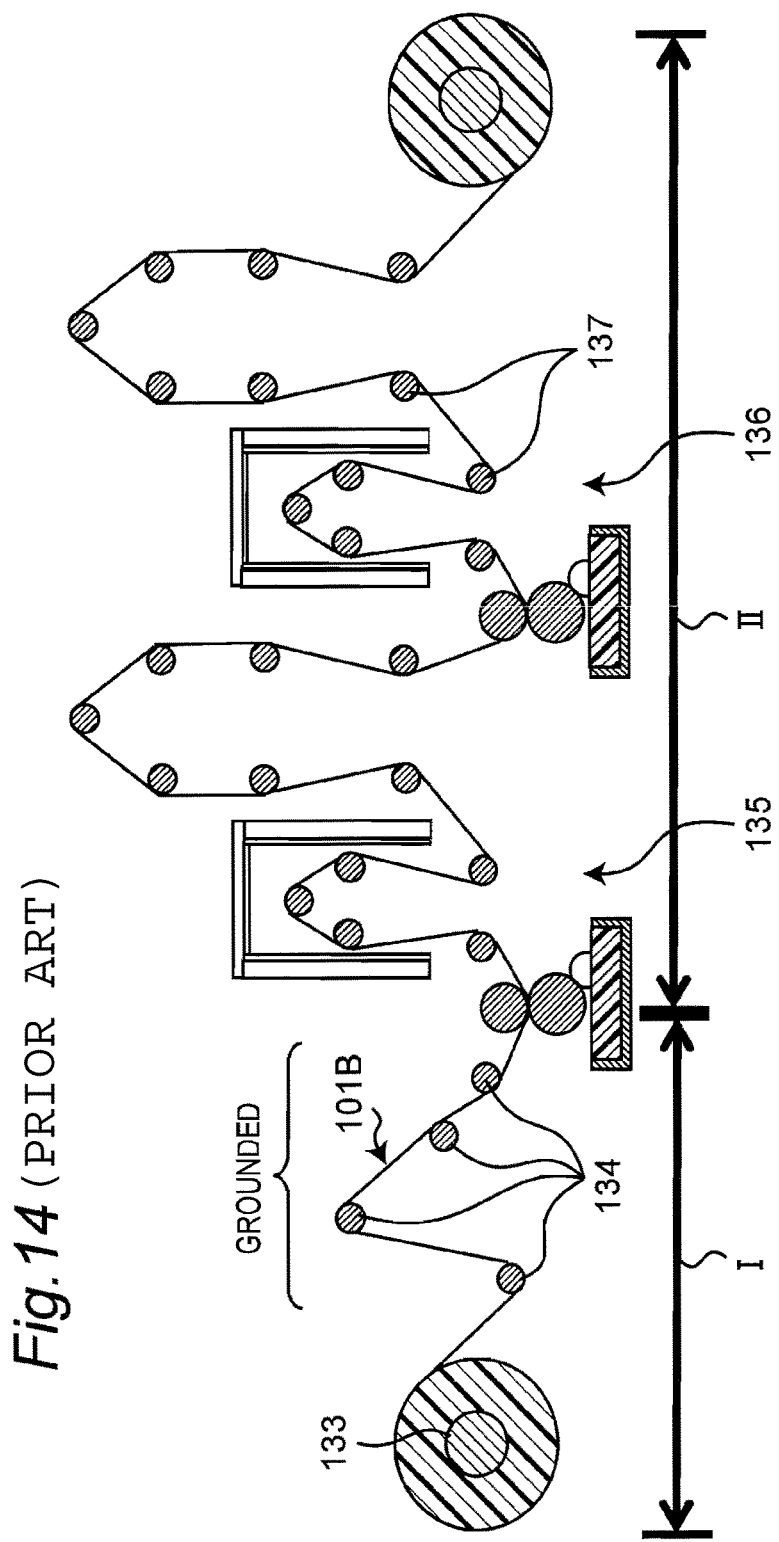
FIG. 14 is an explanation view of a case in which the conventional sheet in FIG. 13A is used in a printing step.
Figure 15:
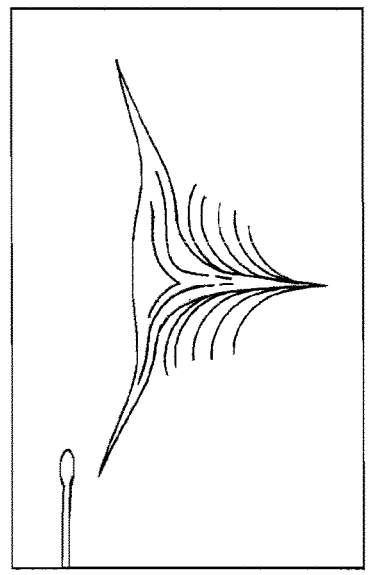
FIG. 15 is a view illustrating the trace of a spark by which the metal deposition portion is damaged.
Figure 16A:
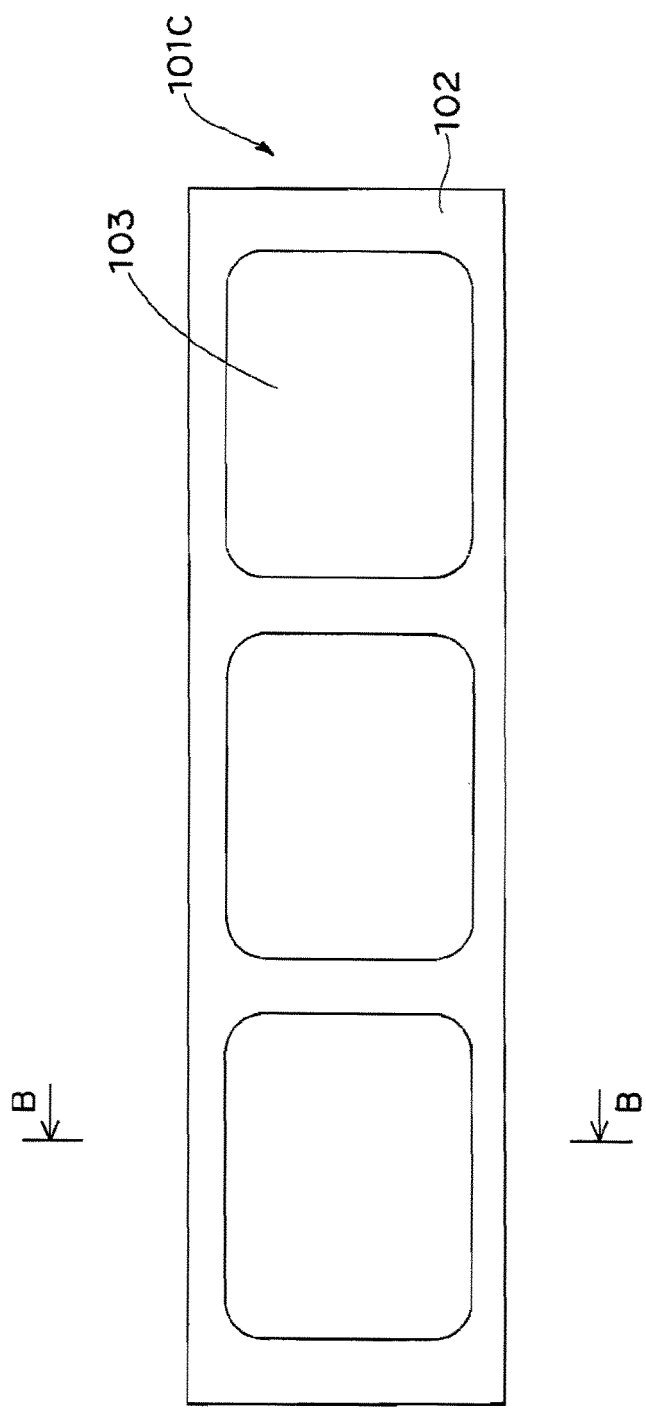
FIG. 16A is a plan view of a conventional transfer sheet for use in a molding step.
Figure 16B:
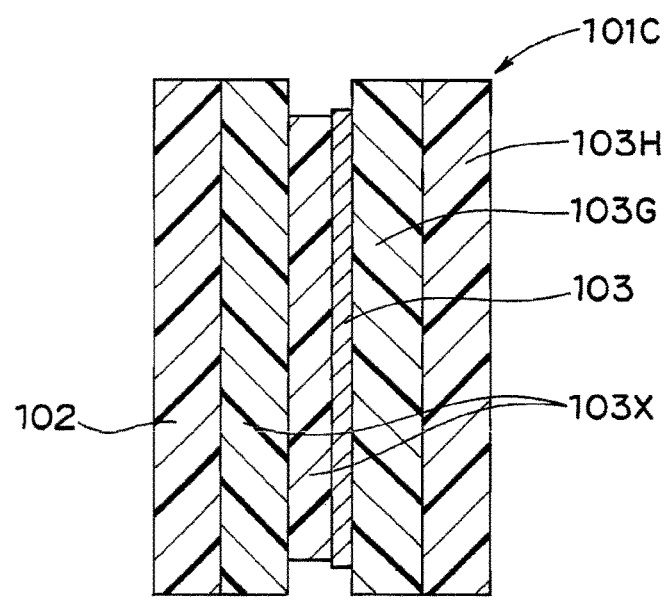
FIG. 16B is a cross-sectional view of FIG. 16A taken along the line B-B therein.
Figure 17:
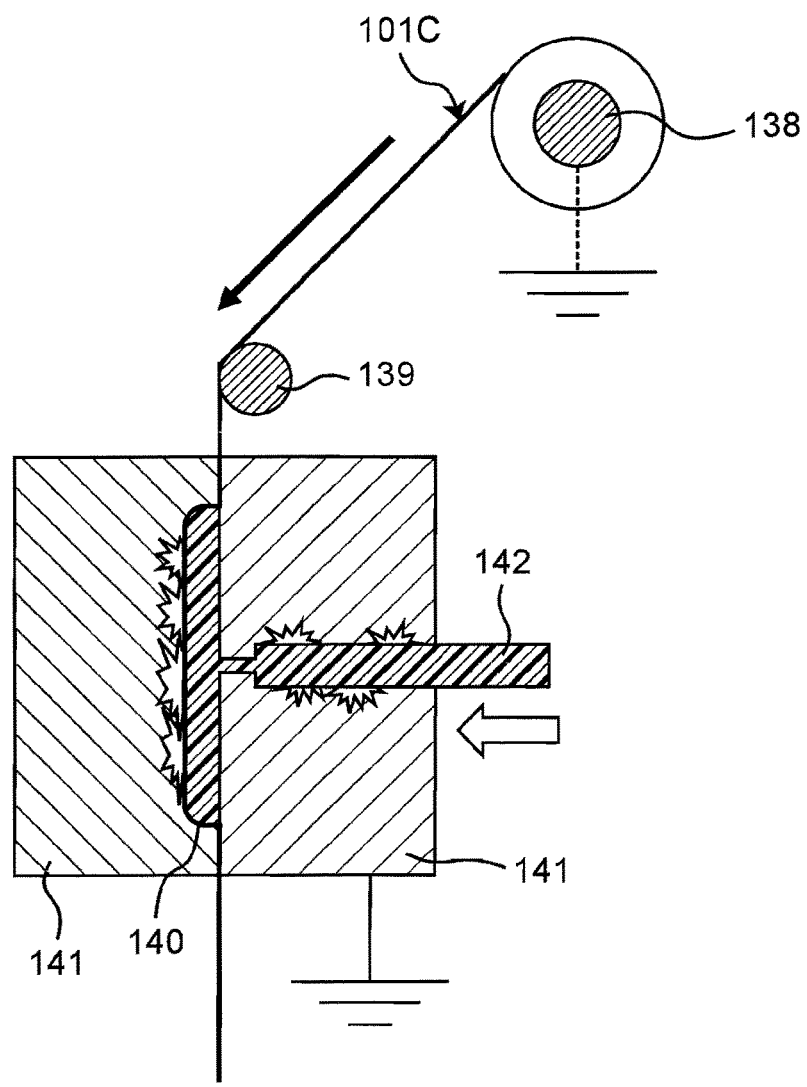
FIG. 17 is an explanation view of a case in which the conventional transfer sheet in FIG. 16A is used in a molding step.
Figure 18:
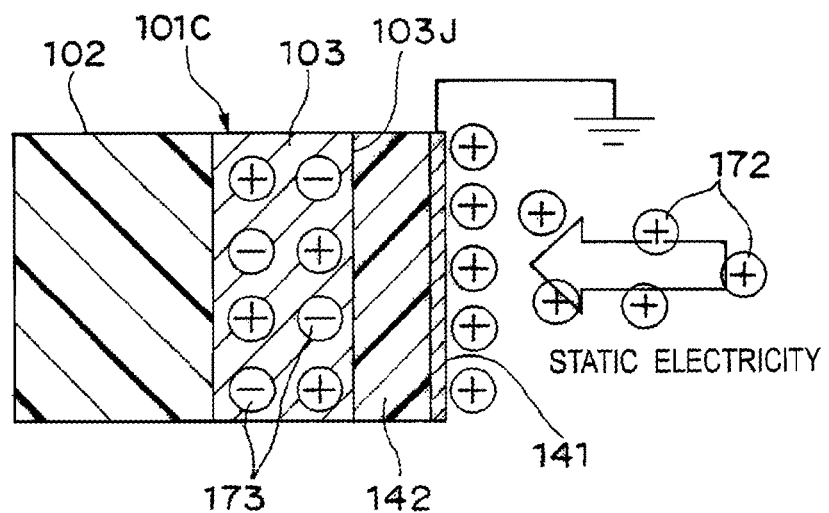
FIG. 18 is an explanation view of a state in which the mold has positive electric charges generated by friction between a synthetic resin and the mold in injection molding.
Figure 19:
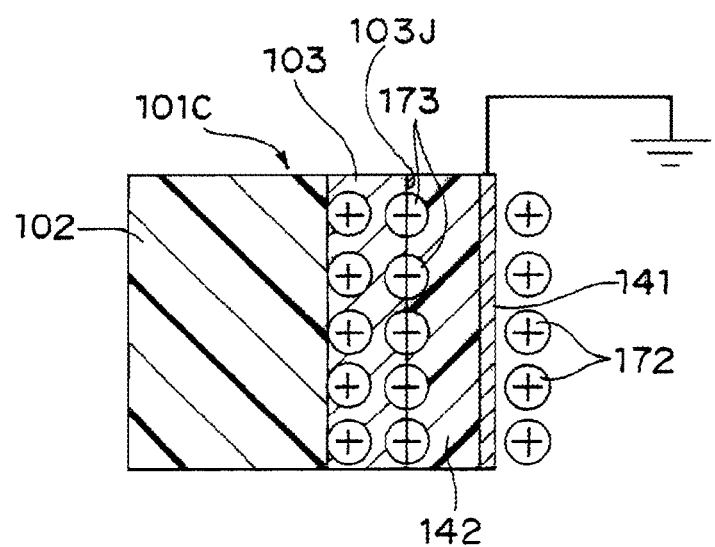
FIG. 19 is an explanation view of an electrical imbalance of distribution of free electrons in the metal deposition portion.
Figure 20:
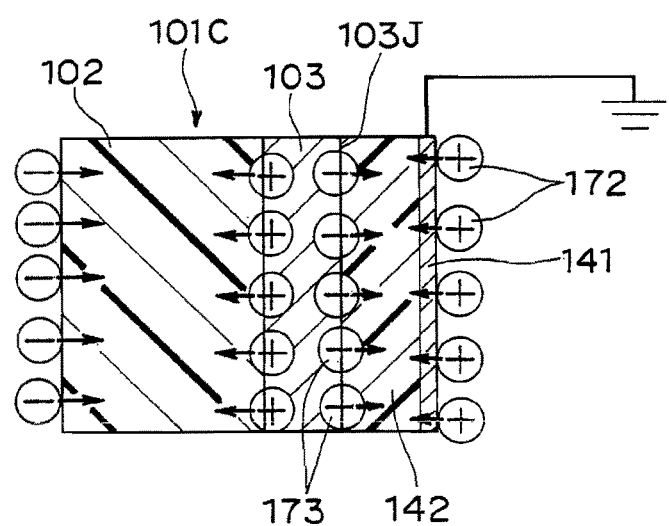
FIG. 20 is an explanation view of a state in which a surface side of a substrate sheet is negatively charged.
Figure 21:
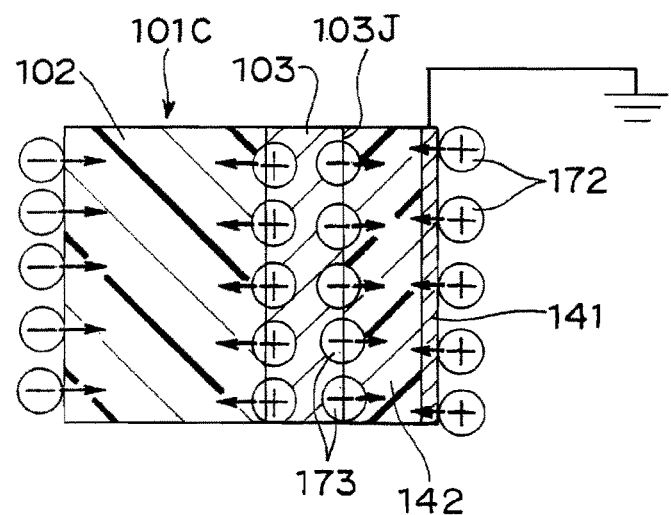
FIG. 21 is an explanation view of a state in which electric charges are accumulated in the metal deposition portion.
Figure 22:
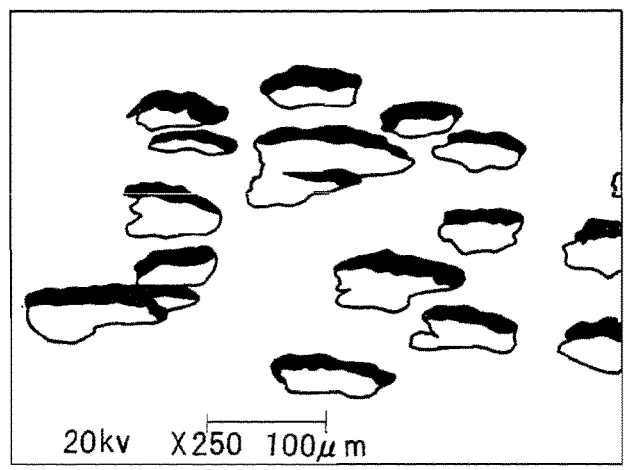
FIG. 22 is an explanation view of a state in which the metal deposition portion is damaged with a spark caused.

In a simultaneous design molding step using the static eliminating sheet 1C for simultaneous design molding steps, as shown in FIG. 7, the grounded portion 5a of the static eliminating band portion 5 located at the rear end of the substrate sheet 2 is brought into direct contact with the grounded conductive roller 43 for guiding the static eliminating sheet, and the sheet 1A wound off from the conductive roller 43 for guiding the sheet is caused to travel through a large number of guiding rollers 44 for traveling toward a guiding roller for taking up the sheet, not shown. Reference numeral 41 denotes a grounded fixed mold, reference numeral 42 denotes a movable mold which is contacted with or separated from the fixed mold 41, reference numeral 42a denotes a cavity of the movable mold 42, and reference numeral 45 denotes an injection molding nozzle for injecting a molten resin into the cavity 42a. While the fixed mold 41 side is grounded in this example, the movable mold 42 side may be grounded, or both the molds 41 and 42 may be grounded. Furthermore, this arrangement of the fixed mold 41 and movable mold 42 is only an example, and the mold 42 may be fixed whereas the mold 41 may be movable.

In this simultaneous design molding step, the grounded portion 5a at the end of the static eliminating band portion 5 is grounded in direct contact with the grounded conductive roller 43 for guiding the static eliminating sheet (sheet feeding roller), and the static eliminating band portion 5 formed over the entire length of the sheet 1A is grounded in direct contact with the grounded mold 41. In this state, the transfer sheet 1, that is, the static eliminating sheet 1C for simultaneous design molding steps is fed in between both the molds 41 and 42. Then, both the molds 41 and 42 are closed. Next, a molten resin is injected from the nozzle 45 into the cavity 42a of both the molds 41 and 42. After cooling the molding resin 7, both the molds 41 and 42 are opened. Then, a decorated molded article (the static eliminating sheet 1C adhered and fixed to the molding resin 7) 50 is separated from the molds 41 and 42 with use of ejector pins (not shown).

During the injection molding in this step, the molds 41 and 42 have positive electric charges caused due to friction between the molten resin and the molds 41 and 42, when the molten resin is injected from the nozzle 45 into the cavity 42a of both the molds 41 and 42 or when the molten resin is led into the cavity 42a of both the molds 41 and 42. These positive electric charges polarize the conductive material portion 3 of the static eliminating sheet 10 to cause negative electric charges on the resin portion of the conductive material portion 3a of the static eliminating sheet 10 (electrostatic induction). Some of the negative electric charges thus caused flow out from the conductive material portion 3a to the static eliminating band portion 5, and are eliminated from the static eliminating band portion 5 toward the conductive roller 43 for guiding the sheet. Furthermore, the magnitude of the polarization due to the positive electric charges can be minimized by the static eliminating function of the static eliminating band portion 5 to relax the polarization. Moreover, when the decorated molded article 50 is to be separated from the molds 41 and 42, or when the decorated molded article 50 is to be separated from the molds 41 and 42 with use of ejector pins (not shown), the attractive force caused by the positive electric charges is made weaker, and the negative electric charges of the conductive material portion 3a is released, which have been bound by the positive electric charges in the molds 41 and 42, the negative electric charges flow from the conductive material portion 3a into the static eliminating band portion 5, and are eliminated from the static eliminating band portion 5 to the conductive roller 43 for guiding the sheet. Therefore, the negative electric charges of the conductive material portion 3a are not likely to be discharged to the molds 41 and 42, thereby preventing generation of sparks. This advantageous effect is quite effective for, in particular, large-area conductive material portions 3a (for example, portions with the area per 1 m of film being 500 $cm^2$ or more) and conductive material portions 3a isolated in the insulating substrate sheet 2 (island-shaped portions arranged to be isolated).

(Others)

It is to be noted that the present invention is not to be limited to the embodiments described above, and can be implemented in other various aspects.

For example, each of the first design portion 3b, the first design portion 3c, the second adhesive layer 3d, the second design portion 3e, and the third adhesive layer 3f may be an insulating design or an adhesive ink portion.

Furthermore, in the various embodiments described above, when the static eliminating band portion 5 is to be composed of the same material in the same layer as the conductive material portion 3a, it is preferable that the static eliminating band portions 5 each have the same thickness as that of the conductive material portion 3a in the design portion 3. The reason is that unless the static eliminating band portion 5 has the same thickness as that of the conductive material portion 3a in the design portion 3, a difference in height will be caused between the conductive material portion 3a and the static eliminating band portion 5, resulting in a possibility of causing printing defects.

Furthermore, the thickness of the static eliminating band portion 5 is preferably, for example, 20 to 200 nm. When the minimum thickness of the static eliminating band portion 5 is thinner than 20 nm, it may become difficult to ensure that the static eliminating function is fulfilled. The maximum thickness of the static eliminating band portion 5 depends on the design of the design portion 3, and is thus not particularly limited to this thickness.

Furthermore, the width of the static eliminating band portion 5 is related to the amount of electrification, and as shown in FIG. 8, is preferably 10 mm or more when the amount of electrification of 3 kV or less is defined as safe.

Alternatively, when the amount of electrification is not taken into consideration, it is preferable to form the static eliminating band portion 5 so as to have a width at least greater than 5 mm in the shorter side direction (width direction) of the transfer sheet. The reason is that unless the static eliminating band portion 5 has a length of 5 mm or less in the width direction of the transfer sheet, a resistance value of the static eliminating band portion 5 will be increased, thereby resulting in difficulty with effective grounding for discharging charges present in the conductive material portion 3a to the outside of the transfer sheet.

In the case where plural, for example, at least two static eliminating band portions 5 are formed on each side of the design portion 3 (for example, on each side in the width direction of the transfer sheet), even if one of the static eliminating band portions 5 is broken in any of the deposition step, the printing step, and the molding step, the remaining static eliminating band portion 5 will be able to perform the static eliminating function, thereby allowing the reliability to be improved.

It is to be noted that the specification and the claims disclose that the static eliminating band portion is continuously located along the longitudinal direction of the substrate sheet. This disclosure means that the static eliminating band portion is continuously located along the longitudinal direction over the entire length of the substrate sheet, and that the static eliminating band portion 5 connecting the plurality of conductive material portions may be discontinuously located for each length grounded in contact with the roller or the mold (for example, in the deposition step in FIG. 3A, as long as the static eliminating band portion 5 continuously connecting between the rightmost guiding roller 33 for traveling and the rightmost one of the grounded guiding rollers 32 for traveling allows electric charges which can be generated in the rightmost guiding roller 33 for traveling to be eliminated in the grounded rightmost guiding roller 32 for traveling, the length between the rightmost guiding roller for traveling and the rightmost one of the grounded guiding rollers 32 for traveling). In short, the disclosure means that there is continuity between the roller or the mold where electric charges are generated and the roller which is able to be grounded in contact with the static eliminating band portion 5.

As described above, the static eliminating sheet and the static eliminating system for sheets, as well as the simultaneous design molding method, the printing method, and the deposition method using the static eliminating sheet, according to each of the embodiments of the present invention, can fulfill the static eliminating function of discharging charges in the conductive material portion by continuously locating the static eliminating band portion for connecting the conductive material portions in the design portions in the longitudinal direction of the sheet, thereby allowing sparks to be prevented with certainty.

Now, in order to describe this advantageous effect for further details, charge transfer in the conductive material portion will be considered.

In the conductive material portions arranged independently (for example, in the shape of an island) along the longitudinal direction in the insulating substrate sheet, electric charges are relatively free to be transferred. In a case in which a conductive element grounded unidirectionally or a conductive element with the opposite charge is provided, the electric charges are transferred by Coulomb force. Since the electric charges generated by peeling electrification or the like are increased depending on the contact area, the larger conductive element will increase the total charges of the entire element. Therefore, the sheet with the larger conductive element (the conductive material portion in this case) has a possibility of generating a larger point charge.

Thus, discharge in a step of manufacturing the transfer sheet will be considered first.

In the step of manufacturing a transfer sheet, a sheet for manufacturing a transfer sheet and the grounded conductive roller for guiding the sheet repeat contact with and separate from each other, in fact, at high speed. Therefore, electric charges will be easily generated in the sheet for manufacturing a transfer sheet, as described in the conventional art. In this case, when there are strong electric charges on the conductive material portions in the shape of an island in the insulating substrate sheet (nonconductive element), a large electric potential difference is produced toward a grounded roller or the like. Then, an electric potential difference greater than a dielectric breakdown voltage of the nonconductive element causes discharge, thereby resulting in alteration in appearance. In particular, discharge is easily caused under a hypobaric environment, which will be thus likely to be problematical in steps such as deposition of an insulator or a semiconductor (the case of forming a conductive metal film has no problem because the metal itself will serve as a circuit).

Consequently, in order to prevent discharge in the sheet for manufacturing the transfer sheet, the continuous static eliminating band portion is located as a conductive element to serve as a lightning rod in the sheet for manufacturing the transfer sheet. In this case, since the static eliminating band portion as a conductive element and the conductive material portions can be all considered to have the same electric potential, the electric charges generated in the sheet for manufacturing the transfer sheet pass through the closest conductive element, and flow into the grounded roller. Furthermore, even in a case without direct contact with any grounded element, the discharge can be reduced since no electric field is generated in the region surrounded by the conductive element. Moreover, as described above, when polarization is considered as one cause, the internal conductor portion (in other words, the conductive material portion sandwiched between insulating adhesive layers or insulating design portions) is grounded through the static eliminating band portion to ease the polarized state to a normal stable state, thereby resulting in a possibility of significantly reducing electrification due to external static electricity.

Consequently, connecting the conductive material portions in the design portions isolated in the substrate sheet to each other via the static eliminating band portion allows static electricity accumulated for each pass through the printing apparatus or the molding apparatus to go back to the portion for winding off the sheet, thereby reducing the polarization with the grounded static eliminating band portion serving to ground the sheet side.

This advantageous effect is quite effective for, in particular, large-area conductive material portions 3$a$ (for example, portions with the area per 1 m of film being 500 cm$^2$ or more) and conductive material portions 3$a$ isolated in the insulating substrate sheet 2 (island-shaped portions isolated and arranged).

It is to be noted that any embodiments or any modifications from the various embodiments and modifications described above can be appropriately combined so as to achieve the advantageous effects of each embodiment or modification.

INDUSTRIAL APPLICABILITY

The static eliminating sheet and the static eliminating system for sheets, as well as the simultaneous design molding method, the printing method, and the deposition method using the static eliminating sheet, according to the present invention, can accurately fulfill the static eliminating function of discharging charges in the conductive material portion by continuously locating the static eliminating band portion for connecting the conductive material portions in the design portions in the longitudinal direction of the sheet, thereby allowing sparks to be prevented with certainty.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A static eliminating sheet comprising:
  a substrate sheet;
  a plurality of design portions arranged independently from each other along a longitudinal direction of the substrate sheet and each including at least a conductive material portion; and
  a band-shaped static eliminating band portion extending continuously along the longitudinal direction of the substrate sheet and electrically connecting the conductive material portions in the plurality of design portions to each other,
  wherein the static eliminating band portion has, at a rear end of the substrate sheet on a side of the substrate sheet to be wound off last in the longitudinal direction, a grounded portion which is continuously brought into direct contact with a grounded conductive roller for guiding the static eliminating sheet, the static eliminating band portion being grounded in direct contact with a grounded mold for simultaneous design molding,
  and wherein a portion of the static eliminating band portion other than the grounded portion electrically connects the conductive material portions in the plurality of design portions to each other while the grounded portion does not electrically connect the conductive material portions in the design portions to each other.

2. The static eliminating sheet according to claim 1, wherein the static eliminating sheet is a sheet for forming a transfer sheet, for use in a printing step.

3. The static eliminating sheet according to claim 1, wherein the static eliminating sheet is a transfer sheet for simultaneous design molding, for use in a simultaneous design molding step.

4. The static eliminating sheet according to claim 1, wherein the static eliminating band portion comprises a static eliminating band portion arranged at each side of each design portion in a width direction of the substrate sheet, and wherein each of the static eliminating band portions is arranged to be brought into contact with the plurality of design portions.

5. The static eliminating sheet according to claim 1, wherein the grounded portion has a same width and thickness as those of the portion of the static eliminating band portion other than the grounded portion.

6. The static eliminating sheet according to claim 1, wherein the grounded portion has a larger width or larger thickness than that of the portion of the static eliminating band portion other than the grounded portion.

7. The static eliminating sheet according to claim 1, further comprising:

an auxiliary static eliminating band portion arranged in a width direction of the substrate sheet between the static eliminating band portion and each of the design portions so as to electrically connect the static eliminating band portion to each of the design portions.

8. The static eliminating sheet according to claim 7, wherein the auxiliary static eliminating band portion has a same width and thickness as those of the portion of the static eliminating band portion other than the grounded portion.

9. The static eliminating sheet according to claim 7, wherein the auxiliary static eliminating band portion has a larger width or larger thickness than that of the portion of the static eliminating band portion other than the grounded portion.

* * * * *